(12) United States Patent
Hosseini et al.

(10) Patent No.: US 11,611,961 B2
(45) Date of Patent: *Mar. 21, 2023

(54) LATENCY REDUCTION IN SHARED OR UNLICENSED SPECTRUM

(71) Applicant: QUALCOMM Incorporated, San Diego, CA (US)

(72) Inventors: Seyedkianoush Hosseini, San Diego, CA (US); Srinivas Yerramalli, Hyderabad (IN); Wanshi Chen, San Diego, CA (US); Jing Sun, San Diego, CA (US); Hao Xu, Beijing (CN); Shimman Arvind Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/228,698

(22) Filed: Apr. 12, 2021

(65) Prior Publication Data
US 2021/0258953 A1    Aug. 19, 2021

Related U.S. Application Data

(63) Continuation of application No. 16/551,457, filed on Aug. 26, 2019, now Pat. No. 11,044,725, which is a
(Continued)

(51) Int. Cl.
*H04W 72/04* (2009.01)
*H04L 1/18* (2006.01)
(Continued)

(52) U.S. Cl.
CPC ....... *H04W 72/0446* (2013.01); *H04L 1/1861* (2013.01); *H04L 1/1887* (2013.01);
(Continued)

(58) Field of Classification Search
CPC .... H04L 1/1861; H04L 5/0051; H04W 16/14; H04W 24/10; H04W 72/042;
(Continued)

(56) References Cited

U.S. PATENT DOCUMENTS 9,549,080 B2    1/2017   Tabet et al.
10,397,915 B2 *  8/2019   Hosseini ............... H04L 5/0091
(Continued)

OTHER PUBLICATIONS

Ericsson: "Further Discussion on Support of CSI Measurement and Reporting for LAA", 3GPP TSG RAN WG1 Meeting #80bis, 3GPP Draft; R1-152011, 3rd Generation Partnership Project (3GPP), Mobile Competence Centre, 650, Route Des Lucioles, F-06921 Sophia-Antipolis Cedex, France, vol. RAN WG1, No. Belgrade, Serbia; Apr. 19, 2015, 4 Pages, XP050934860, Retrieved from the Internet: URL: http://www.3gpp.org/ftp/Meetings_3GPP_SYNC/RAN1/Docs/ [retrieved on Apr. 19, 2015].
(Continued)

*Primary Examiner* — Kashif Siddiqui
(74) *Attorney, Agent, or Firm* — Holland & Hart LLP

(57) ABSTRACT

Methods, systems, and devices for wireless communication are described. A user equipment (UE) may transmit uplink (UL) messages in unlicensed spectrum with a reduced UL timing delay. The UL timing delay may be reduced by using a shortened transmission time interval (TTI) (e.g., a TTI that is reduced in duration relative to other TTIs in the system or in a legacy system) or by reducing the number of TTIs between a grant and the corresponding UL message. The reduced UL timing delay may decrease the likelihood that the UE will wait for a subsequent transmit opportunity (TxOp) to transmit the UL message. In some cases, the reduced UL timing delay corresponds to a reduced hybrid automatic repeat request (HARM) processing delay. In some cases, a time difference (e.g., measured in TTIs) between a
(Continued)

measurement reference TTI a corresponding channel state information (CSI) report may also be reduced.

16 Claims, 23 Drawing Sheets

Related U.S. Application Data continuation of application No. 15/460,215, filed on Mar. 15, 2017, now Pat. No. 10,397,915.

(60) Provisional application No. 62/419,688, filed on Nov. 9, 2016.

(51) Int. Cl.
| | |
|---|---|
| H04L 5/00 | (2006.01) |
| H04L 27/00 | (2006.01) |
| H04L 27/26 | (2006.01) |
| H04W 72/12 | (2009.01) |
| H04W 24/10 | (2009.01) |
| H04W 74/08 | (2009.01) |
| H04L 5/14 | (2006.01) |
| H04W 8/22 | (2009.01) |
| H04W 16/14 | (2009.01) |
| H04W 72/0446 | (2023.01) |
| H04L 1/1829 | (2023.01) |
| H04L 1/1867 | (2023.01) |
| H04W 72/23 | (2023.01) |

(52) U.S. Cl.
CPC ............ *H04L 5/001* (2013.01); *H04L 5/0051* (2013.01); *H04L 5/0064* (2013.01); *H04L 5/0091* (2013.01); *H04L 5/0092* (2013.01); *H04L 27/0006* (2013.01); *H04L 27/2602* (2013.01); *H04W 24/10* (2013.01); *H04W 72/23* (2023.01); *H04W 74/0808* (2013.01); *H04L 5/005* (2013.01); *H04L 5/0057* (2013.01); *H04L 5/14* (2013.01); *H04L 27/2603* (2021.01); *H04L 27/26025* (2021.01); *H04W 8/22* (2013.01); *H04W 16/14* (2013.01)

(58) Field of Classification Search
CPC ......... H04W 72/0446; H04W 72/1289; H04W 74/0808; H04W 8/22
See application file for complete search history.

(56) References Cited

U.S. PATENT DOCUMENTS

| | | | | |
|---|---|---|---|---|
| 11,044,725 | B2 * | 6/2021 | Hosseini | ............ H04W 72/042 |
| 2014/0321440 | A1 * | 10/2014 | Yavuz | ................... H04L 1/0007 370/336 |
| 2015/0085797 | A1 | 3/2015 | Ji et al. | |
| 2015/0365931 | A1 | 12/2015 | Ng et al. | |
| 2016/0135148 | A1 | 5/2016 | Novlan et al. | |
| 2016/0249329 | A1 * | 8/2016 | Au | ....................... H04W 48/00 |
| 2016/0255676 | A1 | 9/2016 | Vajapeyam et al. | |
| 2016/0278074 | A1 | 9/2016 | Yang et al. | |
| 2016/0330630 | A1 | 11/2016 | Yoo et al. | |
| 2017/0332397 | A1 | 11/2017 | Li et al. | |
| 2017/0366377 | A1 | 12/2017 | Papasakellariou | |
| 2018/0041325 | A1 * | 2/2018 | Lee | .................. H04W 72/1289 |
| 2018/0132235 | A1 | 5/2018 | Hosseini et al. | |
| 2018/0176938 | A1 | 6/2018 | Shao | |
| 2018/0359068 | A1 * | 12/2018 | Kim | ...................... H04W 72/14 |
| 2018/0368093 | A1 * | 12/2018 | Rahman | .................. H04L 5/001 |
| 2019/0380129 | A1 | 12/2019 | Hosseini et al. | |

OTHER PUBLICATIONS

Ericsson: "Future Compatibility for Operating NR in Unlicensed Spectrum", 3GPP TSG-RAN WG2 #96, 3GPP Draft; R2-168490, 3rd Generation Partnership Project (3GPP), Mobile Competence Centre, 650, Route Des Lucioles, F-06921 Sophia-Antipolis Cedex, France, vol. RAN WG2, No. Reno, Nevada, USA; Nov. 4, 2016, 5 Pages, XP051192517, Retrieved from the Internet: URL:http://www.3gpp.org/ftp/tsg_ran/WG2_RL2/TSGR2_96/Docs/ [retrieved on Nov. 4, 2016].

Huawei., et al., "Processing Time Reduction and Related Procedures for Short TTI", 3GPP TSG RAN WG1 Meeting #87, 3GPP Draft; R1-1611167, 3rd Generation Partnership Project (3GPP), Mobile Competence Centre, 650, Route Des Lucioles, F-06921 Sophia-Antipolis Cedex, France, vol. RAN WG1, No. Reno, USA; Nov. 5, 2016, 8 Pages, XP051189740, Retrieved from the Internet: URL: http://www.3gpp.org/ftp/tsg_ran/WG1_RL1/TSGR1_87/Docs/ [retrieved on Nov. 5, 2016].

Intel Corporation: "Introduction of Cross-Burst Scheduling", 3GPP Draft; R1-160427, 3rd Generation Partnership Project (3GPP), Mobile Competence Centre, 650, Route Des Lucioles, F-06921 Sophia-Antipolis Cedex, France, vol. RAN WG1, No. St. Julian's. Malta; Feb. 6, 2016, XP051064186, Retrieved from the Internet: URL:http://www.3gpp.org/ftp/tsg_ran/WG1_RL1/TSGR1_84/Docs/ [retrieved on Feb. 6, 2016], 5 pages.

Intel Corporation: "Latency Reduction Between UL Grant and PUSCH", 3GPP TSG RAN WG1 Meeting #84, 3GPP Draft; R1-160426, 3rd Generation Partnership Project (3GPP), Mobile Competence Centre, 650, Route Des Lucioles, F-06921 Sophia-Antipolis Cedex, France, vol. RAN WG1, No. St. Julian's, Malta; Feb. 14, 2016, 3 Pages, Feb. 15, 2016-Feb. 19, 2016, XP051053763, Retrieved from the Internet: URL: http://www.3gpp.org/ftp/Meetings_3GPP_SYNC/RAN1/Docs/ [retrieved on Feb. 14, 2016].

International Preliminary Report on Patentability—PCT/US2017/059554, The International Bureau of WIPO—Geneva, Switzerland, May 23, 2019 (170267WO).

International Search Report and Written Opinion—PCT/US2017/059554—ISA/EPO—dated Feb. 1, 2018 (170267WO).

European Search Report—EP22197448—Search Authority—The Hague —dated Jan. 5, 2023.

Qualcomm Incorporated: "Control Details for UL Scheduling in eLAA", 3GPP TSG RAN WG1 #86, R1-166252, 3RD Generation Partnership Project, Mobile Competence Centre 650, Route Des Lucioles, F-06921 Sophia-Antipolis Cedex, France, vol. RAN WG1, No. Gothenburg, Sweden, Aug. 22, 2016-Aug. 26, 2016 Aug. 21, 2016, XP051125293, pp. 1-3, section 1, section 2.2, section 3.

\* cited by examiner

LATENCY REDUCTION IN SHARED OR UNLICENSED SPECTRUM

CROSS REFERENCES

The present Application for Patent is a continuation of U.S. patent application Ser. No. 16/551,457 by Hosseini et al., entitled "Latency Reduction in Shared or Unlicensed Spectrum" filed Aug. 26, 2019, which is a continuation of U.S. patent application Ser. No. 15/460,215 by Hosseini et al., entitled, "Latency Reduction In Shared or Unlicensed Spectrum" filed Mar. 15, 2017, which claims priority to U.S. Provisional Patent Application No. 62/419,688 entitled "Latency Reduction In Unlicensed Spectrum," filed Nov. 9, 2016, assigned to the assignee hereof.

BACKGROUND

The following relates generally to wireless communication and more specifically to latency reduction in unlicensed spectrum.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Wireless multiple-access technologies have been adopted in various telecommunication standards to provide a common protocol that enables different wireless devices to communicate on a municipal, national, regional, and even global level. An example telecommunication standard is LTE. LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology A UE and base station may be configured for wireless communication in a shared or unlicensed radio frequency spectrum. The base station may contend for access to the medium during a limited transmission opportunity (TxOp) that may include both DL and UL transmission time intervals (TTIs). In some cases, a base station may send a grant for a UE to transmit UL information, but the UE may not be able to send the corresponding UL transmission during the same TxOp if the grant is not received sufficiently early. The UE may then wait until the next TxOp to send the UL transmission. This may cause disruptions and delays in the communication between the UE and the base station.

SUMMARY

A user equipment (UE) may transmit uplink (UL) messages in a shared or unlicensed spectrum with a reduced UL timing delay. The UL timing delay may be reduced by using a shortened transmission time interval (TTI) or by reducing the number of TTIs between a grant and a corresponding UL message. The reduced UL timing delay may reduce the likelihood that the UE will wait for a subsequent transmit opportunity (TxOp) to transmit the corresponding UL message. In some cases, the reduced UL timing delay corresponds to a reduced hybrid automatic repeat request (HARQ) processing delay and/or a reduced HARQ transmission timing. In some cases, the reduced UL timing delay corresponds to a threshold difference between a measurement reference TTI and a corresponding channel state information (CSI) report being reduced.

A method of wireless communication is described. The method may include determining whether to use a first timing configuration or a second timing configuration for communication in an unlicensed radio frequency spectrum band, the first timing configuration having a first time difference between a downlink communication and a responsive uplink communication, and the second timing configuration having a second time difference between the downlink communication and the responsive uplink communication, the second time difference being less than the first time difference, receiving a control message from a base station during a TxOp of the unlicensed radio frequency spectrum band, and transmitting an uplink message during the TxOp in response to the control message based at least in part on the first timing configuration or the second timing configuration.

An apparatus for wireless communication is described. The apparatus may include means for determining whether to use a first timing configuration or a second timing configuration for communication in an unlicensed radio frequency spectrum band, the first timing configuration having a first time difference between a downlink communication and a responsive uplink communication, and the second timing configuration having a second time difference between the downlink communication and the responsive uplink communication, the second time difference being less than the first time difference, means for receiving a control message from a base station during a TxOp of the unlicensed radio frequency spectrum band, and means for transmitting an uplink message during the TxOp in response to the control message based at least in part on the first timing configuration or the second timing configuration.

Another apparatus for wireless communication is described. The apparatus may include a processor, memory in electronic communication with the processor, and instructions stored in the memory. The instructions may be operable to cause the processor to determine whether to use a first timing configuration or a second timing configuration for communication in an unlicensed radio frequency spectrum band, the first timing configuration having a first time difference between a downlink communication and a responsive uplink communication, and the second timing configuration having a second time difference between the downlink communication and the responsive uplink communication, the second time difference being less than the first time difference, receive a control message from a base station during a TxOp of the unlicensed radio frequency spectrum band, and transmit an uplink message during the TxOp in response to the control message based at least in part on the first timing configuration or the second timing configuration.

A non-transitory computer readable medium for wireless communication is described. The non-transitory computer-readable medium may include instructions operable to cause a processor to determine whether to use a first timing configuration or a second timing configuration for communication in an unlicensed radio frequency spectrum band, the first timing configuration having a first time difference between a downlink communication and a responsive uplink communication, and the second timing configuration having a second time difference between the downlink communication and the responsive uplink communication, the second time difference being less than the first time difference, receive a control message from a base station during a TxOp of the unlicensed radio frequency spectrum band, and transmit an uplink message during the TxOp in response to the control message based at least in part on the first timing configuration or the second timing configuration.

In some examples of the method, apparatuses, or non-transitory computer-readable medium, determining whether to use the first timing configuration or the second timing configuration may be based at least in part on a UE capability.

In some examples of the method, apparatuses, or non-transitory computer-readable medium, the uplink message may include a CSI report that is based at least in part on the first timing configuration or the second timing configuration.

In some examples of the method, apparatuses, or non-transitory computer-readable medium, the CSI report may be further based at least in part on a reference measurement TTI, and the reference measurement TTI may be based at least in part on the first timing configuration or the second timing configuration.

In some examples of the method, apparatuses, or non-transitory computer-readable medium, the reference measurement TTI precedes the uplink message transmission by a threshold number of TTIs that is based at least in part on the first timing configuration or the second timing configuration.

Some examples of the method, apparatuses, or non-transitory computer-readable medium may include operations, features, means, or instructions for receiving an indication of the reference measurement TTI from the base station, and the reference measurement TTI may be identified based at least in part on the indication.

In some examples of the method, apparatuses, or non-transitory computer-readable medium, the CSI report includes an aperiodic CSI report, and the indication of the reference measurement TTI may be received in a downlink grant or a common physical downlink control channel (CPDCCH) of a first TTI duration or of a second TTI duration.

In some examples of the method, apparatuses, or non-transitory computer-readable medium, the reference measurement TTI may be identified based at least in part on a subband of the unlicensed radio frequency spectrum band, the uplink message may be transmitted on a carrier within the unlicensed radio frequency spectrum band, and the subband comprises a bandwidth that is less than a bandwidth of the carrier.

In some examples of the method, apparatuses, or non-transitory computer-readable medium, the reference measurement TTI may be identified by a set of reference pilots arranged in a configuration having a first density that is greater than a second density of a cell-specific reference signal (CRS) configuration.

In some examples of the method, apparatuses, or non-transitory computer-readable medium, the second timing configuration includes an uplink response delay of three TTIs.

A method of wireless communication is described. The method may include determining whether to use a first TTI duration, a second TTI duration, or both, for communication in an unlicensed radio frequency spectrum band, wherein the second TTI duration is less than the first TTI duration, receiving a control message from a base station during a TxOp of the unlicensed radio frequency spectrum band using the first TTI duration or the second TTI duration, and transmitting an uplink message during the TxOp in response to the control message according to an uplink timing that is based at least in part on whether the control message was received using the first TTI duration or the second TTI duration.

An apparatus for wireless communication is described. The apparatus may include means for determining whether to use a first TTI duration, a second TTI duration, or both, for communication in an unlicensed radio frequency spectrum band, wherein the second TTI duration is less than the first TTI duration, means for receiving a control message from a base station during a TxOp of the unlicensed radio frequency spectrum band using the first TTI duration or the second TTI duration, and means for transmitting an uplink message during the TxOp in response to the control message according to an uplink timing that is based at least in part on whether the control message was received using the first TTI duration or the second TTI duration.

Another apparatus for wireless communication is described. The apparatus may include a processor, memory in electronic communication with the processor, and instructions stored in the memory. The instructions may be operable to cause the processor to determine whether to use a first TTI duration, a second TTI duration, or both, for communication in an unlicensed radio frequency spectrum band, wherein the second TTI duration is less than the first TTI duration, receive a control message from a base station during a TxOp of the unlicensed radio frequency spectrum band using the first TTI duration or the second TTI duration, and transmit an uplink message during the TxOp in response to the control message according to an uplink timing that is based at least in part on whether the control message was received using the first TTI duration or the second TTI duration.

A non-transitory computer readable medium for wireless communication is described. The non-transitory computer-readable medium may include instructions operable to cause a processor to determine whether to use a first TTI duration, a second TTI duration, or both, for communication in an unlicensed radio frequency spectrum band, wherein the second TTI duration is less than the first TTI duration, receive a control message from a base station during a TxOp of the unlicensed radio frequency spectrum band using the first TTI duration or the second TTI duration, and transmit an uplink message during the TxOp in response to the control message according to an uplink timing that is based at least in part on whether the control message was received using the first TTI duration or the second TTI duration.

In some examples of the method, apparatuses, or non-transitory computer-readable medium, the control message may be received using the second TTI duration and the uplink message may be transmitted using the first TTI duration.

In some examples of the method, apparatuses, or non-transitory computer-readable medium, the control message may be received using the second TTI duration, and the uplink message may be transmitted using the second TTI duration.

Some examples of the method, apparatuses, or non-transitory computer-readable medium may include operations, features, means, or instructions for receiving a message from the base station that indicates whether the control message is to be received using the second TTI duration, whether the uplink message is to be transmitted using the second TTI duration, or both.

In some examples of the method, apparatuses, or non-transitory computer-readable medium, a first uplink TTI of the TxOp may be separated from a last downlink TTI of the TxOp by a gap period.

In some examples of the method, apparatuses, or non-transitory computer-readable medium, the uplink message may be transmitted after a response delay of four TTIs of the second TTI duration or six TTIs of the second TTI duration.

In some examples of the method, apparatuses, or non-transitory computer-readable medium, a TTI of the first TTI duration includes one or more uplink TTIs of the second TTI duration, one or more downlink TTIs of the second TTI duration, or both.

Some examples of the method, apparatuses, or non-transitory computer-readable medium may include operations, features, means, or instructions for performing a listen-before-talk (LBT) procedure during a first uplink symbol of an uplink TTI of the second TTI duration following a transition from a downlink TTI of the second TTI duration to the uplink TTI of the second TTI duration.

Some examples of the method, apparatuses, or non-transitory computer-readable medium may include operations, features, means, or instructions for transmitting at least a portion of the uplink message during a half-symbol period of the uplink TTI of the second TTI duration following the LBT procedure.

Some examples of the method, apparatuses, or non-transitory computer-readable medium may include operations, features, means, or instructions for receiving an indication of a downlink TTI of the second TTI duration from the base station.

Some examples of the method, apparatuses, or non-transitory computer-readable medium may include operations, features, means, or instructions for receiving an indication of a number of symbol periods within the second TTI duration.

Some examples of the method, apparatuses, or non-transitory computer-readable medium may include operations, features, means, or instructions for receiving an indication of a TTI configuration for one or more uplink messages in a CPDCCH of the first TTI duration or of the second TTI duration.

In some examples of the method, apparatuses, or non-transitory computer-readable medium, the control message may be a CPDCCH message of the first TTI duration or of the second TTI duration and indicates a reference measurement resource for generating a CSI report.

A method of wireless communication is described. The method may include determining whether to use a first timing configuration or a second timing configuration for communication in an unlicensed radio frequency spectrum band, the first timing configuration having a first time difference between a downlink communication and a responsive uplink communication, and the second timing configuration having a second time difference between the downlink communication and the responsive uplink communication, the second time difference being less than the first time difference, transmitting a control message to a UE during a TxOp of the unlicensed radio frequency spectrum band, and receiving an uplink message during the TxOp in response to the control message based at least in part on the first timing configuration or the second timing configuration.

An apparatus for wireless communication is described. The apparatus may include means for determining whether to use a first timing configuration or a second timing configuration for communication in an unlicensed radio frequency spectrum band, the first timing configuration having a first time difference between a downlink communication and a responsive uplink communication, and the second timing configuration having a second time difference between the downlink communication and the responsive uplink communication, the second time difference being less than the first time difference, means for transmitting a control message to a UE during a TxOp of the unlicensed radio frequency spectrum band, and means for receiving an uplink message during the TxOp in response to the control message based at least in part on the first timing configuration or the second timing configuration.

Another apparatus for wireless communication is described. The apparatus may include a processor, memory in electronic communication with the processor, and instructions stored in the memory. The instructions may be operable to cause the processor to determine whether to use a first timing configuration or a second timing configuration for communication in an unlicensed radio frequency spectrum band, the first timing configuration having a first time difference between a downlink communication and a responsive uplink communication, and the second timing configuration having a second time difference between the downlink communication and the responsive uplink communication, the second time difference being less than the first time difference, transmit a control message to a UE during a TxOp of the unlicensed radio frequency spectrum band, and receive an uplink message during the TxOp in response to the control message based at least in part on the first timing configuration or the second timing configuration.

A non-transitory computer readable medium for wireless communication is described. The non-transitory computer-readable medium may include instructions operable to cause a processor to determine whether to use a first timing configuration or a second timing configuration for communication in an unlicensed radio frequency spectrum band, the first timing configuration having a first time difference between a downlink communication and a responsive uplink communication, and the second timing configuration having a second time difference between the downlink communication and the responsive uplink communication, the second time difference being less than the first time difference, transmit a control message to a UE during a TxOp of the unlicensed radio frequency spectrum band, and receive an uplink message during the TxOp in response to the control message based at least in part on the first timing configuration or the second timing configuration.

In some examples of the method, apparatuses, or non-transitory computer-readable medium, determining whether to use the first timing configuration or the second timing configuration may be based at least in part on a capability of the UE.

In some examples of the method, apparatuses, or non-transitory computer-readable medium, the uplink message may include a CSI report that is based at least in part on the first timing configuration or the second timing configuration.

In some examples of the method, apparatuses, or non-transitory computer-readable medium, the CSI report may be further based at least in part on a reference measurement TTI, and the reference measurement TTI may be based at least in part on the first timing configuration or the second timing configuration.

In some examples of the method, apparatuses, or non-transitory computer-readable medium, the reference measurement TTI precedes the uplink message transmission by a threshold number of TTIs that is based at least in part on the first timing configuration or the second timing configuration.

Some examples of the method, apparatuses, or non-transitory computer-readable medium may include operations, features, means, or instructions for transmitting an indication of the reference measurement TTI, and the reference measurement TTI may be identified based at least in part on the indication.

In some examples of the method, apparatuses, or non-transitory computer-readable medium, the CSI report includes an aperiodic CSI report, and the indication of the reference measurement TTI may be transmitted in a downlink grant or a common physical downlink control channel (CPDCCH) of a first TTI duration or of a second TTI duration.

In some examples of the method, apparatuses, or non-transitory computer-readable medium, the reference measurement TTI may be identified based at least in part on a subband of the unlicensed radio frequency spectrum band, the uplink message may be received on a carrier within the unlicensed radio frequency spectrum band, and the subband comprises a bandwidth that is less than a bandwidth of the carrier.

In some examples of the method, apparatuses, or non-transitory computer-readable medium, the reference measurement TTI may be identified by a set of reference pilots arranged in a configuration having a first density that is greater than a second density of a cell-specific reference signal (CRS) configuration.

In some examples of the method, apparatuses, or non-transitory computer-readable medium, the second timing configuration includes an uplink response delay of three TTIs.

A method of wireless communication is described. The method may include determining whether to use a first TTI duration, a second TTI duration, or both, for communication in an unlicensed radio frequency spectrum band, transmitting a control message from a base station during a TxOp of the unlicensed radio frequency spectrum band using the first TTI duration or the second TTI duration, and receiving an uplink message during the TxOp in response to the control message according to an uplink timing that is based at least in part on whether the control message was transmitted using the first TTI duration or the second TTI duration.

An apparatus for wireless communication is described. The apparatus may include means for determining whether to use a first TTI duration, a second TTI duration, or both, for communication in an unlicensed radio frequency spectrum band, means for transmitting a control message from a base station during a TxOp of the unlicensed radio frequency spectrum band using the first TTI duration or the second TTI duration, and means for receiving an uplink message during the TxOp in response to the control message according to an uplink timing that is based at least in part on whether the control message was transmitted using the first TTI duration or the second TTI duration.

Another apparatus for wireless communication is described. The apparatus may include a processor, memory in electronic communication with the processor, and instructions stored in the memory. The instructions may be operable to cause the processor to determine whether to use a first TTI duration, a second TTI duration, or both, for communication in an unlicensed radio frequency spectrum band, transmit a control message from a base station during a TxOp of the unlicensed radio frequency spectrum band using the first TTI duration or the second TTI duration, and receive an uplink message during the TxOp in response to the control message according to an uplink timing that is based at least in part on whether the control message was transmitted using the first TTI duration or the second TTI duration.

A non-transitory computer readable medium for wireless communication is described. The non-transitory computer-readable medium may include instructions operable to cause a processor to determine whether to use a first TTI duration, a second TTI duration, or both, for communication in an unlicensed radio frequency spectrum band, transmit a control message from a base station during a TxOp of the unlicensed radio frequency spectrum band using the first TTI duration or the second TTI duration, and receive an uplink message during the TxOp in response to the control message according to an uplink timing that is based at least in part on whether the control message was transmitted using the first TTI duration or the second TTI duration.

In some examples of the method, apparatuses, or non-transitory computer-readable medium, the control message may be transmitted using the second TTI duration and the uplink message may be received using the first TTI duration.

In some examples of the method, apparatuses, or non-transitory computer-readable medium, the control message may be transmitted using the second TTI duration and the uplink message may be received using the second TTI duration.

Some examples of the method, apparatuses, or non-transitory computer-readable medium may include operations, features, means, or instructions for transmitting a message to the UE that indicates whether the control message is to be transmitted using the second TTI duration, whether the uplink message is to be received using the second TTI duration, or both.

In some examples of the method, apparatuses, or non-transitory computer-readable medium, a first uplink TTI of the TxOp may be separated from a last downlink TTI of the TxOp by a gap period.

In some examples of the method, apparatuses, or non-transitory computer-readable medium, the uplink message may be received after a response delay of four TTIs of the second TTI duration or six TTIs of the second duration.

In some examples of the method, apparatuses, or non-transitory computer-readable medium, a TTI of the first TTI duration comprises one or more uplink TTIs of the second TTI duration, one or more downlink TTIs of the second TTI duration, or both.

Some examples of the method, apparatuses, or non-transitory computer-readable medium may include operations, features, means, or instructions for transmitting an indication of a downlink TTI of the second TTI duration.

Some examples of the method, apparatuses, or non-transitory computer-readable medium may include operations, features, means, or instructions for transmitting an indication of a number of symbol periods within the second TTI duration.

Some examples of the method, apparatuses, or non-transitory computer-readable medium may include operations, features, means, or instructions for transmitting an indication of a TTI configuration for one or more uplink messages in a CPDCCH of the first TTI duration or of the second TTI duration.

In some examples of the method, apparatuses, or non-transitory computer-readable medium, the control message is a CPDCCH message of the first TTI duration or of the second TTI duration and indicates a reference measurement resource for the UE to generate a CSI report.

DETAILED DESCRIPTION

Figure 1:
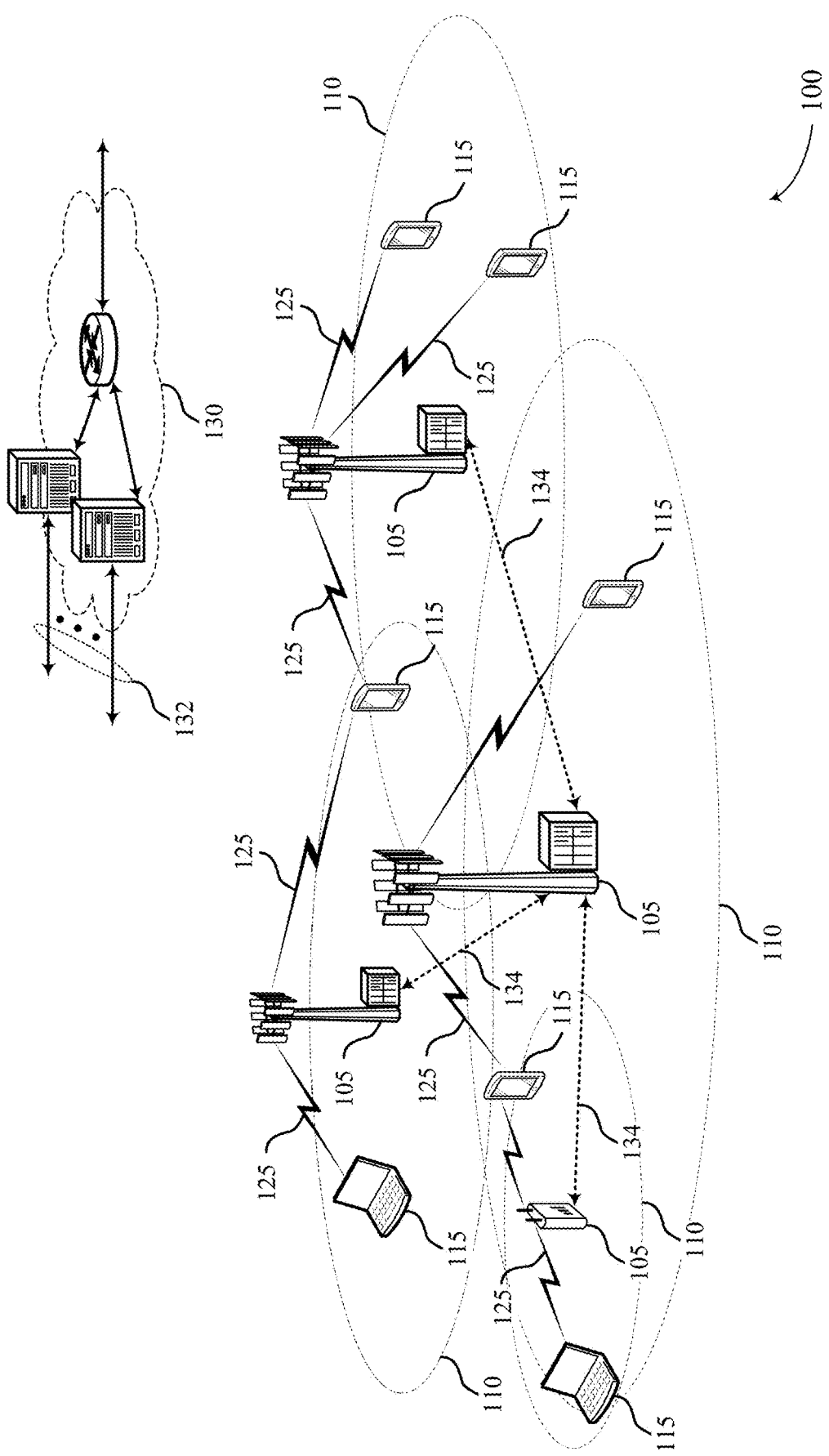
FIG. 1 illustrates an example of a system for wireless communication that supports reduced latency in unlicensed spectrum in accordance with aspects of the present disclosure.

A user equipment (UE) may transmit uplink (UL) messages in unlicensed spectrum with an UL timing delay between downlink (DL) and UL transmissions that is reduced relative to an UL timing delay between DL and UL transmissions in licensed spectrum or other legacy operation. An UL timing delay may be reduced by using a shortened transmission time interval (TTI) (e.g., a TTI of a shorter duration than a TTI used in licensed spectrum). Additionally or alternatively, an UL timing delay may be reduced by configuring fewer TTIs between, for example, a grant of resources and a corresponding UL message transmitted using the granted resources.

Operating with a reduced UL timing delay (e.g., relative to legacy deployments) may reduce the likelihood that the UE will wait for a subsequent transmission opportunity (TxOp) to transmit an UL transmission in response to a DL transmission. For instance, for communication in an unlicensed radio frequency spectrum, a base station may contend for access to the medium during a TxOp that may include both DL and UL TTIs. In some cases, the base station may send a control message with a grant to a UE, and the grant may identify resources for the UE to use to receive DL information or identify resources for the UE to use to transmit UL information. However, the UE may not be able to send a corresponding UL transmission during the same TxOp if an UL timing delay is too long, as may be the case when operating in an unlicensed spectrum using timing delays configured for legacy or licensed spectrum operation. In accordance with aspects of the present disclosure, the UE may transmit UL messages in unlicensed spectrum with an UL timing delay that is reduced relative to an UL timing delay in licensed spectrum. Such an approach may, for example, facilitate transmitting a UL transmission in the unlicensed spectrum during a same TxOp as a grant from the base station in the unlicensed spectrum.

By way of example, an UL timing delay may be reduced by reducing the number of TTIs between a grant and the corresponding UL transmission (e.g., a UL transmission using resources indicated by a UL grant). In some examples of reducing an UL timing delay, a hybrid automatic repeat request (HARQ) timing (e.g., a delay time between receiving a DL transmission and transmitting responsive HARQ feedback) may be reduced. In some examples, a channel state information (CSI) reporting time may be reduced. That is, a delay between a measurement reference TTI and a corresponding CSI report may be reduced. This delay may be reduced for periodic CSI if the UE has shortened processing times (e.g., based on limiting a maximum timing advance, physical downlink control channel (PDCCH) scheduling configurations, CSI scheduling configurations, or other factors).

In some examples, a base station may indicate a reference measurement TTI to a UE in advance. Identifying the reference measurement TTI in advance may provide the UE additional processing time to prepare a CSI report for aperiodic CSI. In some examples, the base station may include reference measurement TTIs in frequency regions with a high density of pilot signals, or the base station may use a selected (e.g., reduced) frequency band for reference measurement TTIs. The UE may detect the reference measurement TTI more quickly based on reduced frequency regions (e.g., a middle 10 MHz portion of a 20 MHz channel bandwidth), thus shortening processing time, and the UE may transmit a CSI report with reduced delay based on the shortened processing time.

Additionally or alternatively, a UE and base station may use a shortened TTI duration to reduce delay between DL and UL communication, where a TTI using the shortened TTI duration may be referred to as shortened TTI (sTTI) or an ultra-low latency TTI (uTTI). In some cases, the base station may schedule the UE using relatively shorter DL sTTIs, and the UE may transmit an UL message using relatively longer UL TTIs (e.g., UL TTIs with a duration longer than a sTTI duration). In other cases, both UL and DL subframes may include UL sTTIs and DL sTTIs. The base station may indicate (e.g., via a control message) an UL pattern to the UE for a subframe including both UL sTTIs and DL sTTIs. The UE may perform an LBT procedure when switching from a DL sTTI to an UL sTTI. The LBT procedure may overlap with a first symbol period of the UL sTTI, so the UE may drop the first symbol period of the UL sTTI (e.g., not transmit using the first symbol of the UL sTTI) or transmit for a half symbol period of the UL sTTI (e.g., transmit during a second half of the first symbol period of the UL sTTI).

The UE may detect DL sTTIs based on a control message (e.g., in a shortened PDCCH (sPDCCH) message or a common sPDCCH (sCPDCCH) message). The control message may indicate whether a current sTTI is a DL sTTI as well as indicate any following DL sTTIs. The base station may also indicate a sTTI configuration to the UE in a control message. For example, the control message may indicate a structure of the sTTI as well as HARQ and CSI configurations. In some cases, a UE may perform CSI reference measurements during a sTTI and generate a CSI report based on the measurements.

Aspects of the disclosure introduced above are initially described below in the context of a wireless communications system. Examples of a cross-TxOp scheduling configuration, a periodic CSI (P-CSI) reporting delay, uplink scheduling, a TxOp configuration, a sTTI configuration, and a listen-before-talk (LBT) procedure are then described. Aspects of the disclosure are further illustrated by and described with reference to apparatus diagrams, system diagrams, and flowcharts that relate to latency reduction in unlicensed spectrum.

FIG. 1 illustrates an example of a wireless communications system 100 in accordance with aspects of the present disclosure. The wireless communications system 100 includes base stations 105, UEs 115, and a core network 130. In some examples, the wireless communications system 100 may be an LTE or LTE-Advanced network, or a New Radio (NR) network. In some cases, wireless communications system 100 may support enhanced broadband communications, ultra-reliable (i.e., mission critical) communications, low latency communications, and communications with low-cost and low-complexity devices. A base station 105 may transmit a DL transmission (e.g., a control message) to a UE 115, and the UE 115 may transmit an UL transmission (e.g., a UL message) to the base station 105 in response to the DL transmission with a reduced delay, for example due to shortened processing times of the UE 115 or a sTTI configuration.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. Control information and data may be multiplexed on an UL channel or DL channel according to various techniques. Control information and data may be multiplexed on a DL channel, for example, using time division multiplexing (TDM) techniques, frequency division multiplexing (FDM) techniques, or hybrid TDM-FDM techniques. In some examples, the control information transmitted during a TTI of a DL channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Wireless communications system 100 may employ time division duplexing (TDD), which is a mode of bidirectional communication in which transmissions in each direction take place on the same carrier frequency but in different time slots. Wireless communications system 100 may also employ frequency division duplexing (FDD), which is a mode of bidirectional communication in which UL and DL communications use different frequency resources. Frame structures for FDD (e.g., frame structure type 1), or TDD (e.g., frame structure type 2 (FS2) or frame structure type 3 (FS3)) may be defined. In some cases, collisions between scheduled low-latency and non-low latency UL transmissions may be more or less frequent depending on the frame structure type used by wireless communications system 100. In accordance with aspects of the present disclosure, a UE 115 may support a reduced delay for responding to DL control information in a TDD TxOp based on shortened UE processing times. In some examples, a subframe (e.g., a nominal or baseline TTI) may be configured for TDD, and the subframe may include short UL TTIs (e.g., UL sTTIs) and short DL TTIs (e.g., DL sTTIs).

A base station 105 and a UE 115 may improve the performance of a wireless communication link by exchanging CSI. CSI may include channel quality information (CQI), a rank indicator (RI), and a precoding matrix indicator (PMI), which may be used to describe characteristics of a radio channel, typically indicating the complex transfer function matrix between one or more transmit antennas and one or more receive antennas. A base station 105 may request channel condition information from a UE 115 in order to efficiently configure and schedule the channel. This information may be sent from the UE 115 in the form of a channel state or CSI report. The base station 105 may indicate a reference measurement TTI to the UE 115 in advance, which may provide the UE 115 with additional time to prepare the CSI report and shorten processing time of the UE 115. In accordance with aspects of the present disclosure, the UE 115 may transmit the CSI report with reduced delay as supported by the shortened processing time.

A channel state report may contain an RI requesting a number of layers to be used for DL transmissions (e.g., based on the antenna ports of the UE 115), a PMI indicating a preference for which precoder matrix should be used (e.g., based on the number of layers), and a CQI representing the highest modulation and coding scheme (MCS) that may be used. CQI may be calculated by a UE 115 after receiving predetermined pilot symbols such as a cell-specific reference signal (CRS) or a channel state information reference signal (CSI-RS). RI and PMI may be excluded if the UE 115 does not support spatial multiplexing, or is not operating in a mode that supports spatial multiplexing. The types of information included in the report may determine a reporting type. Channel state reports may be periodic or aperiodic. That is, a base station 105 may configure a UE 115 to send periodic reports at regular intervals, and may also request additional reports as needed (e.g., in an aperiodic manner). In accordance with aspects of the present disclosure, the delay between CSI generation and CSI reporting may be reduced for a periodic CSI report based on a capability of a UE 115 or a shortened processing time of the UE 115. Aperiodic reports may include wideband reports indicating the channel quality across an entire cell bandwidth.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex communications (e.g., communications that do not include simultaneous transmission and reception) at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. A base station 105 may also be referred to as an eNodeBs (eNB) or next generation NodeB (gNB), or with other terms as described in the present disclosure.

A base station 105 may be connected by an S1 interface to the core network 130. The core network may be an evolved packet core (EPC), which may include at least one Mobility Management Entity (MME), at least one serving gateway (S-GW), and at least one packet data network gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, IP connectivity, and other access, routing, or mobility functions. At least some of the network devices, such as base stations 105, may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra high frequency (UHF) frequency region using frequency bands from 700 MHz to 2600 MHz (2.6 GHz), although in some cases a wireless local area network (WLAN) may use frequencies as high as 4 GHz. This region may also be known as the decimeter band, since the wavelengths range from approximately one decimeter to one meter in length. UHF waves may propagate mainly by line of sight, and may be blocked by buildings and environmental features. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length.

Wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115.

In some cases, the antennas of a base station 105 or UE 115 may be located within one or more antenna arrays, which may support beamforming or multiple-input, multiple-output (MIMO) operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

Wireless communications system 100 may be a packet-based network that operate according to a layered protocol stack. In the user plane, communications at the bearer or packet data convergence protocol (PDCP) layer may be IP-based. A radio link control (RLC) layer may in some cases perform packet segmentation and reassembly to communicate over logical channels. A medium access control (MAC) layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and a network device, network device, or core network 130 supporting radio bearers for user plane data. At the Physical (PHY) layer, transport channels may be mapped to physical channels.

Time intervals in LTE or NR, which may be supported by wireless communications system 100, may be expressed in multiples of a basic time unit (which may be a sampling period of $T_s=1/30,720,000$ seconds). Time resources may be organized according to radio frames of length of 10 ms ($T_f=307200$ $T_s$), which may be identified by a system frame number (SFN) ranging from 0 to 1023. Each frame may include ten subframes numbered from 0 to 9, each having a duration of 1 millisecond. A subframe may be further divided into two slots each having a duration of 0.5 millisecond, and each slot may contain 6 or 7 modulation symbol periods (depending on the length of the cyclic prefix prepended to each symbol). Excluding the cyclic prefix, each symbol period may contain 2048 sample periods. In some cases, the subframe may be the smallest scheduling unit, also known as a TTI. In other cases, a TTI may be shorter than a subframe or may be dynamically selected (e.g., in short TTI bursts or in selected component carriers using sTTIs).

A resource element may consist of one symbol period and one subcarrier (e.g., a 15 kHz frequency range). A resource block may contain 12 consecutive subcarriers in the frequency domain and, for a normal cyclic prefix in each orthogonal frequency division multiplexed (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE 115 receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple DL CCs and one or more UL CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter TTIs (e.g., sTTIs or uTTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). This may include the 5 GHz Industrial, Scientific, and Medical (ISM) band. An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (e.g., the number of symbols in a TTI) may be variable. In some cases, an eCC may utilize a different symbol duration than other CCs, which may include use of a reduced symbol duration as compared with symbol durations of the other CCs. A shorter symbol duration may be associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). In accordance with aspects of the present disclosure, a UE 115 may use a reduced TTI duration to shorten processing times, which may enable the UE 115 to transmit UL messages in response to DL transmissions with a reduced delay.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE-U) radio access technology or NR technology in an unlicensed band such as the 5 GHz ISM band. When operating in unlicensed radio frequency spectrum bands, wireless devices such as base stations 105 and UEs 115 may employ LBT procedures to ensure the channel is clear before transmitting data. In some cases, operations in unlicensed bands may be based on a CA configuration in conjunction with CCs operating in a licensed band. Operations in unlicensed spectrum may include DL transmissions, UL transmissions, or both. Duplexing in unlicensed spectrum may be based on FDD, TDD or a combination of both. In various examples, unlicensed spectrum may also be referred to as an unlicensed radio frequency spectrum band, a shared spectrum, a shared radio frequency spectrum band, and the like. Such spectrum may refer to a frequency band on which devices attempting to use the frequency may contend for access, and in some examples may reserve the spectrum for a period of time after performing a successful contention procedure. Although the features of the present disclosure are described with reference to licensed spectrum, the described features are applicable to any radio frequency spectrum that is shared among users that may or may not be considered as licensed users, but requires LBT and/or contention procedures like those described with reference to unlicensed spectrum.

Wireless systems that support low latency operations, such as wireless communications system 100, may utilize timing configurations and TTI configurations to reduce a delay between UL and DL transmission. Thus, a UE 115 and a base station 105 may communicate using a timing configuration which may reduce a delay between DL and UL transmissions. The UE 115 and base station 105 may also use shortened TTIs to shorten processing times for the UE 115 and reduce the delay between UL and DL transmissions.

Figure 2:
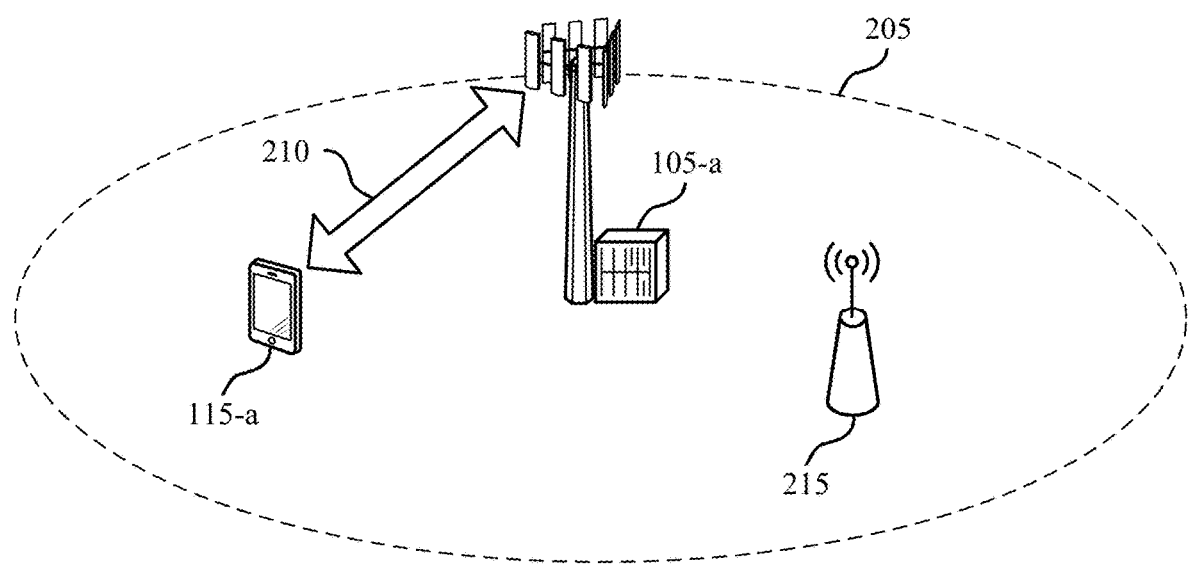
FIG. 2 illustrates an example of a wireless communications system that supports latency reduction in unlicensed spectrum in accordance with aspects of the present disclosure.

FIG. 2 illustrates an example of a wireless communications system 200 for latency reduction in unlicensed spectrum in accordance with aspects of the present disclosure. Wireless communications system 200 may include base station 105-a and UE 115-a, which may be examples of the corresponding devices described with reference to FIG. 1. Base station 105-a and UE 115-a may communicate over a communication link 210. Wireless communications system 200 may also include an access point 215, located within a geographic coverage area 205 of the base station 105-a, which may be an example of another device contending for the access to the same wireless medium. Base station 105-a, UE 115-a, and access point 215 may communicate in an unlicensed radio frequency spectrum.

Some wireless systems may have different frame structures for licensed and unlicensed spectrum operation, and for FDD and TDD. For example, UE 115-a and base station 105-a may communicate using a frame structure such as FS3 when communicating in unlicensed spectrum. Base station 105-a may perform an LBT operation, and if it wins access to the medium, may schedule a subframe for DL or UL transmission. Base station 105-a may then transmit a DL burst transmission over a set of consecutive DL subframes (e.g., a DL burst transmission). Base station 105-a may start the DL burst transmission anywhere within an initial subframe. Similarly, base station 105-a may end the DL burst transmission in the middle of a last subframe of the DL burst transmission based on a DL pilot time slot configuration. Therefore, in some examples the initial and last subframes of a DL burst transmission may be partial subframes. In other examples, the initial and end subframes may be full subframes.

A frame may include TTIs configured for DL or UL transmission. In some examples, UE 115-a may determine whether a subframe or other TTI is configured for DL based on whether it detects a cell-specific reference signal (CRS), e.g., over symbols 0 and 7 of a subframe (e.g., a first symbol of each slot). In some examples, base station 105-a may include a number of symbols of a current or a following subframe to UE 115-a in a common PDCCH (CPDCCH) message. In some cases, base station 105-a may configure a subframe for UL transmission, and base station 105-a may transmit an offset (e.g., from the end of a DL transmission to the start of an UL transmission) and a number of UL subframes on CPDCCH in a valid DL subframe. The number of subframes for UE 115-a to wait may include DL subframes or blank subframes.

In some cases, base station 105-a may schedule an UL transmission across TxOps to ensure there is sufficient time for UE 115-a to respond (e.g., to a DL transmission). For example, during a first TxOp, base station 105-a may transmit a grant for transmission by the UE 115-a during an UL subframe in a following TxOp. UE 115-a may have a time delay between receiving the DL transmission and transmitting the corresponding UL transmission. The time delay may allow UE 115-a to decode the DL transmission and prepare an UL response. In some cases, base station 105-a may schedule an UL subframe too soon after a grant for UE 115-a to finish processing the grant. Base station 105-a may perform cross-TxOp scheduling to allow UE 115-a to prepare for UL transmission in advance. In some examples, the base station 105-a may transmit two grants. A first grant may include an indication of a number of subframes to wait following an UL subframe of the first TxOp. The first grant may also indicate when to drop transmission resources (e.g., not transmit over at least a portion of the granted transmission resources) based on the first grant if a second grant is not received. The second grant may also indicate two values. The first value may be an offset value (e.g., the number of subframes between when the second grant is received and a first UL subframe). The second value may be an UL duration (e.g., the number of consecutive subframes configured for UL transmission).

In some examples, the UE 115-a may identify a valid reference measurement TTI by detecting the presence of a CRS during the TTI. For example, the UE may identify a valid reference measurement subframe by detecting the presence of a CRS over the first symbol of a slot of the subframe. In some examples, a subframe may not be a valid reference measurement subframe if the subframe is a partial subframe. The identification of the valid reference measurement TTI may introduce a delay in a processing time of UE 115-a. UE 115-a may account for the delay in other procedures (e.g., HARQ timing, UL scheduling timing, reducing a maximum timing advance, among others). In other cases, UE 115-a may improve processing time to compensate for the delay. UE 115-a may reduce CSI processing time for both periodic CSI (P-CSI) and aperiodic CSI (A-CSI).

According to aspects of the present disclosure, the time between a reference measurement TTI and a P-CSI report TTI may be reduced. Base station 105-a may schedule UE 115-a to periodically report CSI. UE 115-a may measure the CSI in a reference TTI and report the CSI in a later report TTI. UE 115-a may transmit the CSI report in a TTI n, and UE 115-a may generate the CSI report in a reference measurement TTI $n-n_{CQI\_REF}$, where $n-n_{CQI\_REF}$ may refer to a most recent valid TTI, and $n_{CQI\_REF}$ may be greater than or equal to a threshold duration for reporting measurements generated in a valid reference measurement TTI (e.g., following a specification). In some examples, the duration of $n_{CQI\_REF}$ may be a duration of a configured number of subframes, for example 4 milliseconds or 4 subframes. Base station 105-a may select the threshold based on a number of CSI processes. In some examples, base station 105-a may reduce the threshold (e.g., using a threshold of 3 milliseconds or 3 subframes). If the threshold is reduced, a number of CSI processes or a CSI report type may be constrained. In other examples, the threshold may not be reduced. Base station 105-a may select whether to reduce the threshold based on capabilities of UE 115-a. In some cases, base station 105-a may dynamically select the threshold. For example, base station 105-a may reduce the threshold as UE 115-a moves closer to base station 105-a.

Base station 105-a may indicate a reference measurement TTI for an A-CSI report in advance. In some wireless systems, base station 105-a may transmit a CSI trigger to UE 115-a. UE 115-a may measure the CSI in the same TTI that base station 105-a transmitted the CSI trigger (e.g., a CSI trigger subframe being a reference subframe). In some examples, base station 105-a may indicate the reference measurement TTI in advance so that UE 115-a has additional time to prepare for the CSI report. In some examples, base station 105-a may use a 2-stage CSI trigger, and a reference measurement TTI may not be the same TTI as the TTI that triggers a CSI operation. Base station 105-a may configure a TTI as a reference measurement TTI and indicate the reference measurement TTI in a grant. In other examples, base station 105-a may indicate the reference measurement TTI in a CPDCCH message. When UE 115-a receives a CSI report trigger, UE 115-a may use the most recent valid reference measurement TTI to generate an A-CSI report. In some examples, a number of CSI processes or a CSI report type may be limited based on capabilities of UE 115-a based on a selected processing timing.

In some cases, UE 115-a may detect a valid reference measurement TTI based on a transmission band or a pilot symbol density. In some wireless systems, base station 105-a may indicate to UE 115-a that a subframe is a valid reference measurement subframe by transmitting a CRS in symbol 0 and symbol 7 of a subframe. Thus, UE 115-a may not know whether the subframe is a valid reference measurement subframe until symbol 7. To reduce CSI processing time, base station 105-a may use a portion of a band for CRS transmission. For example, in a 20 MHz bandwidth allocation, base station 105-a may use the middle 10 MHz for CRS transmission. A limited CRS frequency region may reduce CRS processing times. In other examples, base station 105-a may reserve a frequency region with a high density of pilot signals. For example, base station 105-a may reserve the middle 6 physical resource blocks (PRBs). In some examples, base station 105-a may reserve the region over symbol 0 or symbol 7 of a subframe. In some examples, base station 105-*a* may reserve the region for symbol 7 of the subframe, or if sTTIs are configured. UE 115-*a* may reduce the time to detect a valid reference measurement TTI for both P-CSI and A-CSI reporting.

UE 115-*a* and base station 105-*a* may communicate using sTTIs to reduce UE 115-*a* processing times. In some wireless systems, base station 105-*a* may configure a TxOp to include all DL subframes, all UL subframes, or DL subframes followed by UL subframes. Some wireless systems may not have a guard period between the DL and UL subframes, and may operate with an assumption that there is an immediate switching in the transmission direction. In some cases, base station 105-*a* may configure UE 115-*a* to perform an LBT procedure during the switch from a DL TTI to an UL TTI. For example, base station 105-*a* may configure a 25 microsecond LBT procedure to detect hidden nodes. Base station 105-*a* may reduce a TTI duration to improve scheduling rates of UE 115-*a*, CSI feedback reporting, etc. Base station 105-*a* may reduce the TTI duration by splitting each subframe into a set of sTTIs. The sTTIs of the set may be the same length, or may be different lengths.

In some cases, base station 105-*a* may schedule UE 115-*a* using DL sTTIs. A DL subframe may be split into multiple DL sTTIs to schedule UL transmission. For example, a 1-slot DL sTTI may schedule a 1 ms UL TTI. In some examples, base station 105-*a* may reduce processing time by reducing a maximum timing advance and limiting a control region. In some examples, UE 115-*a* may be scheduled for UL transmission 2.5 milliseconds after a grant of resources. Base station 105-*a* may redefine the time boundaries of the subframes to account for the new processing time. For example, base station 105-*a* may shift an UL TxOp based on the DL sTTIs. The shift may allow a DL sTTI to schedule UL transmission in earlier UL subframes. UE 115-*a* may decode control information in sPDCCH faster than control information in PDCCH, which may further allow UE 115-*a* to be scheduled faster using grants in sTTIs.

Both UL and DL TTIs may be split into UL and DL sTTIs. The transmission directions may stay the same within the TTIs (e.g., a DL subframe may include DL sTTIs and a UL subframe may include UL sTTIs). Base station 105-*a* may configure the DL sTTIs to schedule the UL sTTIs. In some examples, base station 105-*a* may schedule multiple UL sTTIs with a single grant during a DL sTTI. For example, a single DL sTTI may be used to schedule two UL sTTIs.

In some cases, a subframe may be split into a set of DL and UL sTTIs. Base station 105-*a* may schedule multiple transmission directions in a single subframe (e.g., a subframe may include DL sTTIs and UL sTTIs). For example, base station 105-*a* may split a DL subframe into a one-symbol control message, three two-symbol DL sTTIs, and a one-slot UL sTTI. Base station 105-*a* may schedule UE 115-*a* for an UL transmission in the same subframe, or UE 115-*a* may generate a CSI report and transmit the CSI report in the same subframe. In some cases, splitting the subframe into multiple UL and DL sTTIs may increase a number of sounding reference signal (SRS) TxOps. The additional SRS TxOps may allow multiple UEs 115 to transmit SRS within a shortened time period. Base station 105-*a* may perform an LBT procedure between each switch from a DL sTTI to an UL sTTI. In some cases, base station 105-*a* may perform multiple LBT procedures during a single frame. Base station 105-*a* may identify and select unoccupied bands for future transmissions during the LBT procedures. Base station 105-*a* may tune a transmitter and/or receiver to a bandwidth after each LBT procedure.

Base station 105-*a* may indicate an UL pattern to UE 115-*a* for a subframe capable of including UL and DL sTTIs (e.g., with a control message). In some examples, base station 105-*a* may transmit an indication for the UL pattern in a CPDCCH message for a current subframe or following subframes. The pattern of each subframe may be selected from a set of patterns, which in some examples, may reduce overhead when compared with other types of indications. In other examples, the UL pattern may be indicated in a sPDCCH message in each sTTI, which may indicate the offset (e.g., from the start of the subframe) and duration of the UL transmission. In other examples, each sCPDCCH may indicate which of the following sTTIs are UL sTTIs.

UE 115-*a* may perform an LBT procedure during a transition from a DL sTTI to an UL sTTI. In some examples, UE 115-*a* may refrain from transmitting during a first symbol period of an UL sTTI. In other examples, UE 115-*a* may transmit for a half-symbol period of the UL TTI after performing the LBT procedure. In some examples, the LBT procedure may have a duration of approximately 25 microseconds. Transmitting during a half-symbol period may provide an additional delay between DL and UL transmissions while providing increased throughput. For example, UE 115-*a* may be allocated 35.5 microseconds between DL sTTIs and UL sTTIs instead of the delay due to the LBT (e.g., 25 microseconds). UE 115-*a* may begin UL transmissions over communication link 210 in advance of an UL sTTI, which may provide base station 105-*a* more time to switch from an UL mode to a DL mode. For example, UE 115-*a* may start UL transmissions 10.5 microseconds in advance such that base station 105-*a* has more time for switching transmission modes after receiving the UL transmissions. Transmitting during a half-symbol period of an UL sTTI may involve additional overhead for the half-symbol transmission. Therefore, the number of switching points in a subframe may be configurable or determined based on a tolerable overhead of wireless communications system 100.

UE 115-*a* may detect a DL sTTI based on an indication received from base station 105-*a*. In some wireless systems, UE 115-*a* may detect a DL transmission based on identifying a CRS in symbol 0 or symbol 7 of a subframe. In examples with an sTTI duration of one slot, including a CRS in the first symbol of each sTTI may overlap with the first symbol of each slot of a subframe, and therefore a legacy approach for detecting CRS according to subframe approach may be adopted. However, due to DL transmissions using sTTIs, UE 115-*a* may be scheduled for a DL transmission which may not overlap with a symbol carrying CRS according to a legacy approach. Therefore, in some examples, base station 105-*a* may indicate which sTTIs may be used for DL transmission, which may include an explicit indication of which sTTIs will be used for DL transmission. In some examples, the indication may be transmitted in a sPDCCH message or a sCPDCCH message (e.g., in the first symbol of each sTTI) and inform UE 115-*a* that a current sTTI, or a number of following sTTIs, are valid DL sTTIs. In other examples, base station 105-*a* may include a high density of pilot symbols over a first symbol period of a sTTI (e.g., occupying every resource element), which may indicate to UE 115-*a* that the sTTI is a DL sTTI. For example, 6 PRBs may be allocated for transmitting the pilot symbols. In other examples, a DL transmission may include CRS in a first symbol period of each sTTI.

Base station 105-*a* may indicate a sTTI configuration to UE 115-*a* in a control signal. For example, base station 105-*a* may indicate the sTTI configuration for the current or following subframe in a CPDCCH message. In other examples, a sCPDCCH message may be included in a sTTI region to signal the structure of the current sTTI as well as following sTTIs. In other examples, base station 105-*a* may explicitly signal a structure (e.g., a duration and transmission direction) of the current sTTI as well as following sTTIs in a CPDCCH message or sPDCCH message. Indications of an sPDCCH (e.g., as included in each sTTI) may indicate an offset and an UL duration, or may indicate which of the subsequent N sTTIs are UL sTTIs, where N may be configurable. The structure may include HARQ and CSI configurations (e.g., reporting timelines). If a DL sTTI can schedule multiple UL sTTIs, different CSI timelines may be configured based on the CSI reporting type.

UE 115-*a* may perform CSI reference measurements in a sTTI. In some wireless systems, a valid reference measurement subframe may be identified based on a CRS in symbol 0 and symbol 7. However, a DL sTTI may not overlap with a symbol carrying CRS, but the DL sTTI may still be usable for CSI reference measurements. In examples of A-CSI reporting, a reference measurement sTTI may be the same sTTI in which an UL grant for a CSI report is transmitted. In some examples, CPDCCH or sCPDCCH may be used to indicate one or more reference measurement sTTIs in a subframe for P-CSI reporting or A-CSI reporting. In some examples, a sCPDCCH message may indicate whether a sTTI is a reference measurement resource. The sCPDCCH message may also indicate which of the following X sTTIs may be valid reference measurement resources, and X may be configurable. In some examples, UE 115-*a* may make CSI reference measurements for a subframe and transmit the CSI report in an UL sTTI in the subframe. The indications of the CSI reference measurement resources may inform UE 115-*a* of CSI-RS resources for a sTTI. UE 115-*a* may rate match around the CSI-RS resources.

Figure 3:
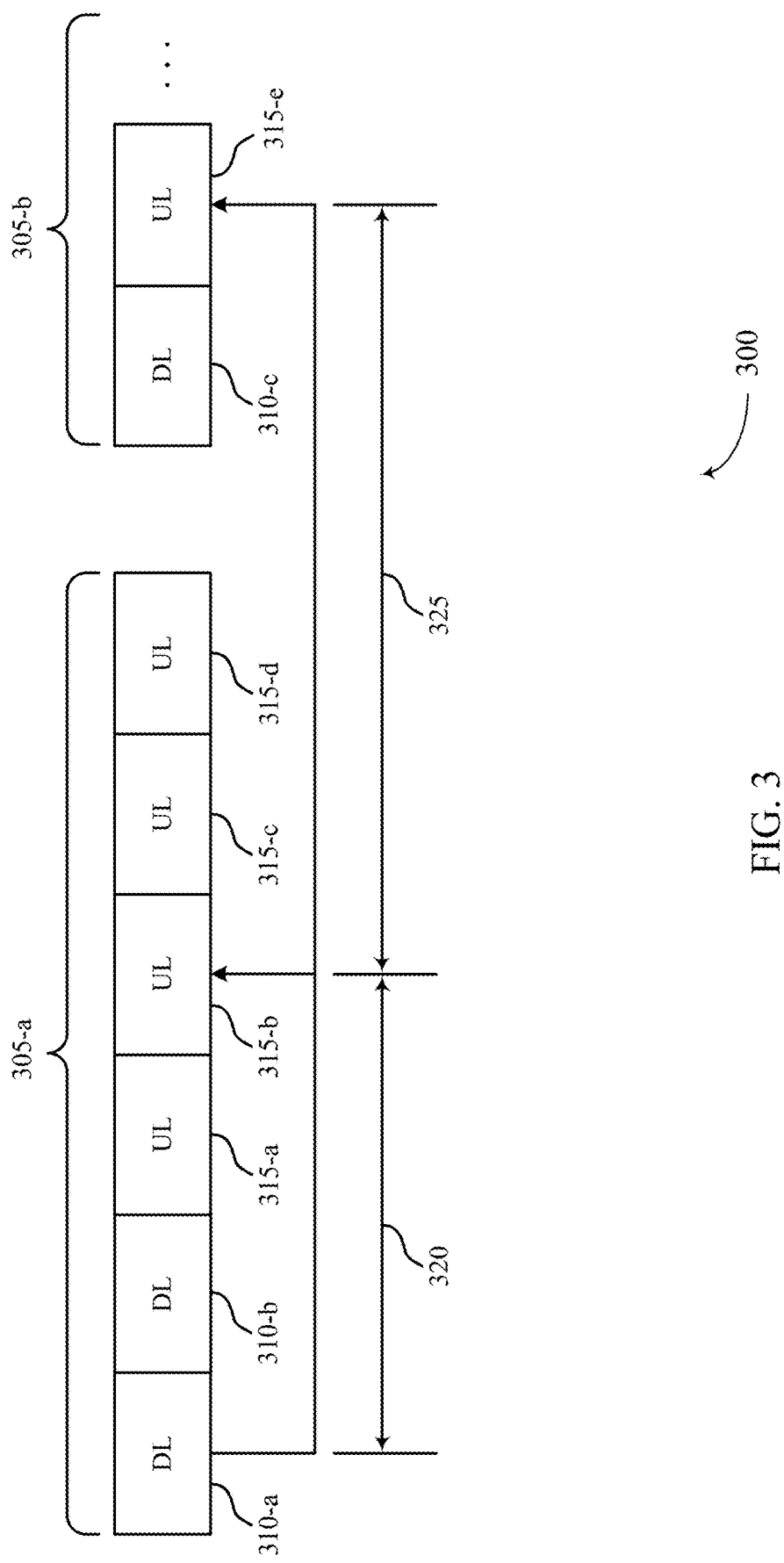
FIG. 3 illustrates an example of a cross-TxOp scheduling in accordance with aspects of the present disclosure.

FIG. 3 illustrates an example of a cross-TxOp scheduling 300 in unlicensed spectrum in accordance with aspects of the present disclosure. For example, a base station 105 may schedule a UE 115 for UL transmission across a TxOp to give the UE 115 time to prepare for the UL transmission. The aforementioned base station 105 and UE 115 are not shown, and may be examples of a base station 105 or UE 115 as described with reference to FIGS. 1 and 2.

In some cases, the base station 105 may configure TxOp 305-*a* with DL subframes 310-*a* and 310-*b*, as well as UL subframes 315-*a*, 315-*b*, 315-*c*, and 315-*d*. The DL subframes 310 and the UL subframes 315 may have a common duration. Additionally, the base station 105 may configure TxOp 305-*b*, with DL subframe 310-*c*, and one or more UL subframes 315, including at least UL subframe 315-*e*. A base station 105 may schedule an UL transmission across TxOps 305 to provide additional processing time to a UE 115. The base station 105 may perform cross-TxOp scheduling to, for example, provide additional processing time for the UE 115 to prepare for a UL transmission.

For example, during TxOp 305-*a*, the base station 105 may transmit an indication to the UE 115 (e.g., during subframe 310-*a*) of a UL transmission scheduling during UL subframe 315-*b* in the TxOp 305-*a*. The UL transmission scheduling may have an UL timing delay 320 after the indication during subframe 310-*a* (e.g., an n+3 subframe timing indication). The UL timing delay 320 may be shorter than a legacy UL timing delay (e.g., an n+4 subframe timing delay), which may enable more UL subframes to be scheduled during a same TxOp 305 than the legacy UL timing delay. However, the UE 115 may have a processing delay that is longer than the UL timing delay 320. The time delay 320 may be due to UE 115 preparing an UL transmission or receiving other DL transmissions. Thus, in some cases, the base station 105 may schedule an UL subframe 315 (e.g., UL subframe 315-*b*) too soon after a grant for the UE 115 to finish processing the grant and prepare an UL transmission. In other words, depending on the processing delay of a UE 115, some UL subframes cannot be scheduled within the same TxOp under certain scenarios, such as those that employ a legacy timing. Thus, during TxOp 305-*a*, the base station 105 may also transmit an indication to the UE 115 (e.g., during subframe 310-*a*) of another UL scheduling during UL subframe 315-*e* in the following TxOp 305-*b* to provide cross-TxOp scheduling. However, cross-TxOp scheduling may complicate UL scheduling, and may result in greater communications latency as compared with scheduling that is supported by reduced UL timing delays as described herein.

In cross TxOp scheduling, the base station 105 may transmit two grants to the UE 115. A first grant, transmitted at subframe 310-*a*, may include an indication of a number of subframes to wait (e.g., wait period 325) following an UL subframe 315 (e.g., following UL subframe 315-*b*) of first TxOp 305-*a*. In cross-TxOp scheduling, this wait period 325, following the time delay 320, may span TxOp 305-*a* and part of TxOp 305-*b*. The first grant may also indicate when to drop the first grant if a second grant is not received. The second grant, transmitted during DL subframe 310-*c*, may also indicate two values. The first value may be an offset value (e.g., the number of subframes between when the second grant is received and UL subframe 315-*e*). The second value may be an UL duration (e.g., the number of consecutive UL subframes 315 in the UL transmission).

Figure 4:
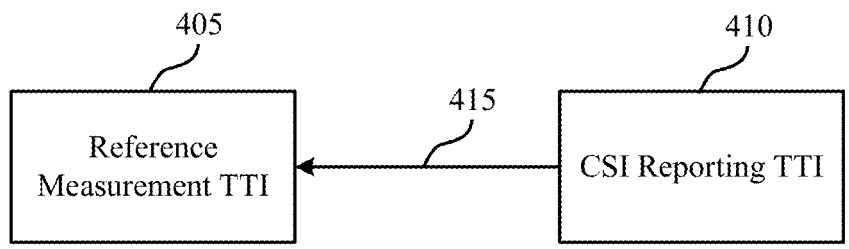
FIG. 4 illustrates an example of a periodic CSI report delay that supports latency reduction in unlicensed spectrum in accordance with aspects of the present disclosure.

FIG. 4 illustrates an example of a P-CSI report delay 400 configured for latency reduction in unlicensed spectrum in accordance with aspects of the present disclosure. A base station 105 may schedule a UE 115 to periodically report CSI, and may also trigger aperiodic CSI reports. Each CSI report may be based on a reference measurement TTI 405, and may be transmitted in an uplink transmission according to a reduced UL timing delay. The aforementioned base station 105 and UE 115 are not shown, and may be examples of a base station 105 or UE 115 as described with reference to FIGS. 1 and 2.

The UE 115 may generate the P-CSI report based on a reference measurement TTI 405 and report the P-CSI in a CSI reporting TTI 410. For example, the CSI reporting TTI 410 may be a subframe n, and a reference measurement TTI 405 may be a subframe $n-n_{CQI\_REF}$, where $n_{CQI\_REF}$ is associated with the delay 415 (e.g., a number of TTIs) between generating a CSI report and transmitting the CSI report. In some examples, the delay 415 may be 4 milliseconds, and thus $n_{CQI\_REF}$ may be 4 subframes. In an example employing a reduced UL timing delay, the delay 415 may be 3 milliseconds, and thus $n_{CQI\_REF}$ may be 3 subframes. In some examples, the delay 415 may have a reduced duration that is related to a duration of some number of sTTIs, such as 4 sTTIs, 3 sTTIs, 6 sTTIs, or any other number of sTTIs.

The base station 105 may select the delay 415 based on a number of CSI processes. In some examples, the base station 105 may reduce the delay 415 as compared to a legacy delay 415. If the delay 415 is reduced, a number of CSI processes or a CSI report type may be constrained. In other examples, the delay 415 may not be reduced as compared to a legacy delay 415. The base station 105 may select whether to reduce the delay 415 based on capabilities of the UE 115. In some cases, the base station 105 may dynamically select the delay 415. For example, the base station 105 may reduce the delay 415 as the UE 115 moves closer to the base station 105.

Figure 5:
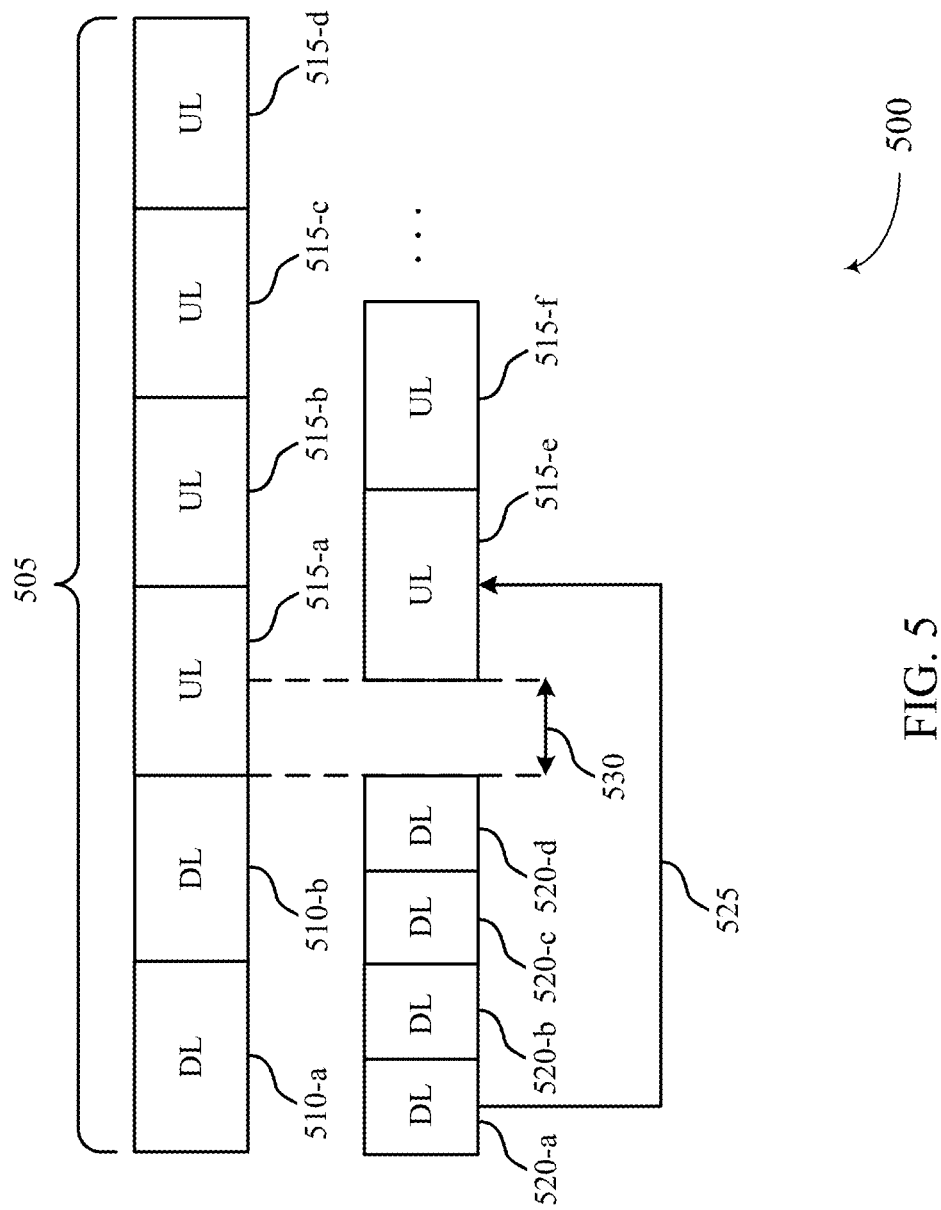
FIG. 5 illustrates an example of an uplink scheduling that supports latency reduction in unlicensed spectrum in accordance with aspects of the present disclosure.

FIG. 5 illustrates an example of an UL scheduling 500 configuration for latency reduction in unlicensed spectrum in accordance with aspects of the present disclosure. A base station 105 may transmit DL control information or other DL transmissions using DL sTTIs. As illustrated, there may be a gap represented by shift 530 between the DL burst of sTTIs 520 and the shifted UL subframes 515-e and 515-f. The base station 105 may schedule a UE 115 for UL transmission using the shifted UL subframes 515-e and 515-f. The aforementioned base station 105 and UE 115 are not shown, and may be examples of a base station 105 or UE 115 as described with reference to FIGS. 1 and 2.

In the example of FIG. 5, a TxOp 505 configured with DL subframes 510-a and 510-b (e.g., nominal or baseline DL TTIs) and UL subframes 515-a, 515-b, 515-c, and 515-d (e.g., nominal or baseline UL TTIs) is depicted relative to a configuration that includes DL sTTIs 520-a, 520-b, 520-c, or 520-d, and shifted UL subframes 515-e and 515-f. The subframes may have a common duration relative to one another and the sTTIs may have a common duration relative to one another. The base station 105 may schedule the UE 115 using grants transmitted during DL sTTIs 520-a, 520-b, 520-c, or 520-d. DL sTTIs 520-a and 520-b may, combined, occupy the same time interval as DL subframe 510-a.

FIG. 5 depicts an exemplary relationship of transmission directions in TTIs for a configuration that employs subframes as compared to a configuration employing sTTIs. Relative to TTIs having a longer duration, such as DL subframe 510-a, the duration of DL sTTIs 520 may be shorter and may also have the same transmission direction.

DL sTTI 520-a may include control information (e.g., a control message) that schedules resources of the UL subframes 515 (e.g., in accordance with a reduced UL timing delay 525). In order to support the reduced UL timing delay 525, a processing time between receiving a grant in DL sTTI 520-a and transmitting a responsive UL transmission may be reduced by decreasing a maximum timing advance associated with and limiting a control region within DL sTTIs 520. In some examples, the shift 530 may be 0.5 milliseconds, and the UE 115 may be scheduled for UL transmission 2.5 milliseconds after a grant received in one of the DL sTTIs 520. In some examples, the base station 105 may redefine the time boundaries of the subframes to account for a new processing time. For example, the base station 105 may shift an UL transmission based on the DL sTTIs 520. The shift 530 may allow DL sTTI 520-a to schedule UL transmission starting with shifted UL subframe 515-e. The control information may be included in an sPDCCH of the sTTI 520-a, which the UE 115 may be able to decode more quickly than control information in a PDCCH. Including the control information in an sPDCCH in the sTTI 520-a may further allow the UE 115 to be scheduled faster using grants in DL sTTIs 520, thereby supporting the reduced UL timing delay 525.

Figure 6:
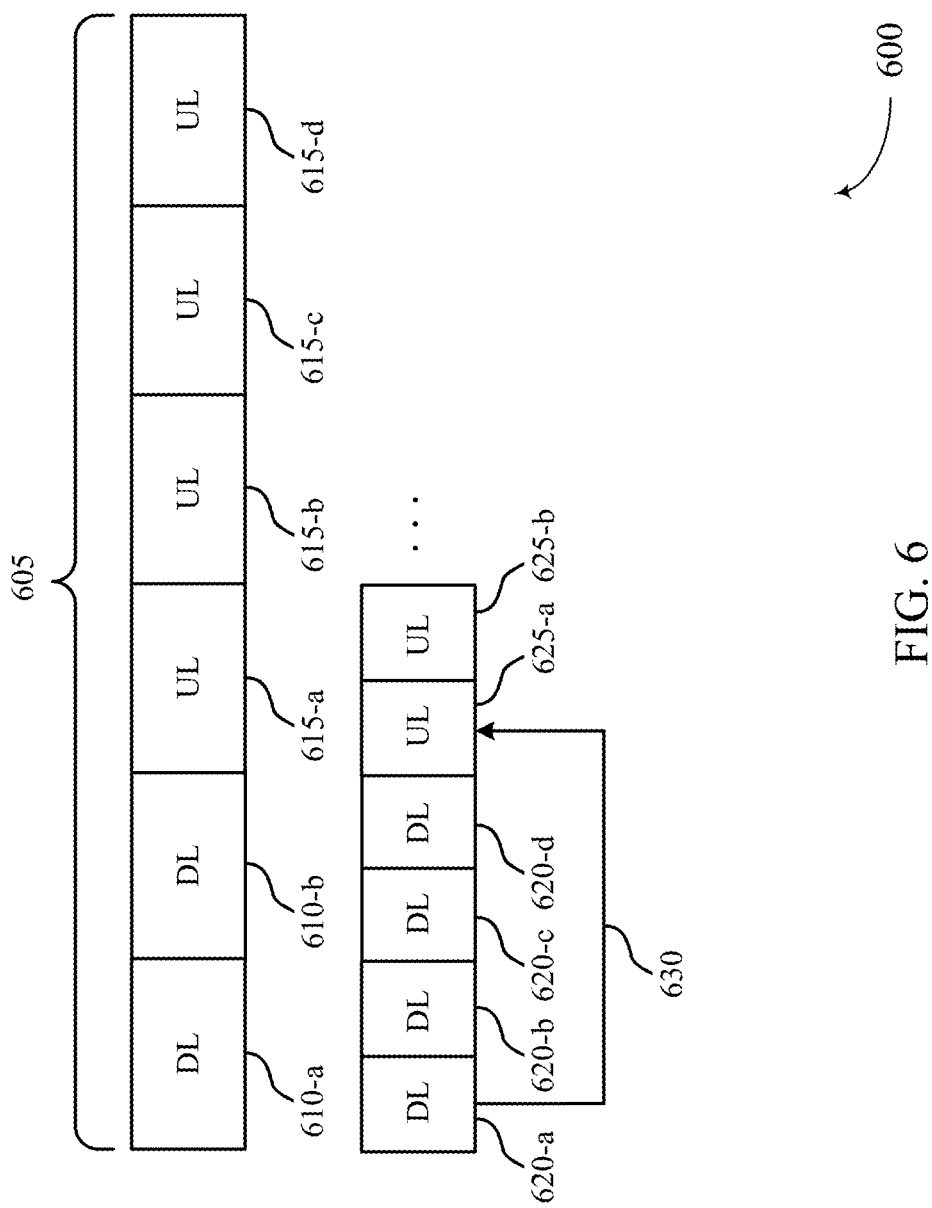
FIG. 6 illustrates an example of a TxOp configuration that supports latency reduction in unlicensed spectrum in accordance with aspects of the present disclosure.

FIG. 6 illustrates an example of a TxOp configuration 600 for latency reduction in unlicensed spectrum in accordance with aspects of the present disclosure. A base station 105 may transmit DL control information to a UE 115 using DL sTTIs 620. A set of sTTIs may correspond to a same time period as a single subframe (e.g., from a different time configuration of the same wireless network). The base station 105 may schedule the UE 115 for UL transmission using grants transmitted during DL sTTIs 620. The aforementioned base station 105 and UE 115 are not shown, and may be examples of a base station 105 or UE 115 as described with reference to FIGS. 1 and 2.

In the example of FIG. 6, a TxOp 605 configured with DL subframes 610 (e.g., nominal or baseline DL TTIs) and UL subframes 615 (e.g., nominal or baseline UL TTIs) is depicted relative to a configuration that includes DL sTTIs 620 and UL sTTIs 625. The UL subframes 615 and DL subframes 610 may have a common duration relative to one another, and the sTTIs 620, 625 may have a common duration relative to one another. The base station 105 may schedule the UE 115 using grants transmitted during DL sTTIs 620-a, 620-b, 620-c, or 620-d. UE 115 may transmit UL information using UL sTTIs 625-a and 625-b. As depicted, within a same time period, a greater quantity of sTTIs than subframes may be configured.

FIG. 6 depicts an exemplary relationship of transmission directions in TTIs for a configuration that employs subframes as compared to a configuration employing sTTIs. Relative to TTIs having a longer duration, such as DL subframe 610-a, the transmission directions for sTTIs may have a consistent transmission direction with the subframes they are aligned in time with; as illustrated in FIG. 6, sTTIs 620-a and 620-b both are both configured for DL, coinciding with the subframe 610-a being configured for DL. Shortened TTIs 620-c and 620-d may be similarly configured with a transmission direction (e.g., a DL direction) that is consistent with a TTI having a longer duration, such as subframe (or TTI) 610-b. Likewise, sTTIs 625-a and 625-b may be configured with the same transmission direction as UL subframe 615-a.

The base station 105 may configure the DL sTTI 620-a to schedule UL sTTI 625-a (e.g., in accordance with a reduced UL timing delay 630). In some examples, the base station 105 may schedule multiple UL sTTIs 625 with a single grant of a DL sTTI. For example, DL sTTI 620-a may schedule UL sTTIs 625-a and 625-b. In some examples, the UL timing delay 630 may be associated with multiples of the sTTI duration. For example, the UE 115 may be scheduled based on an n+4 timing delay, where UL timing delay 630 is associated with a delay of 4 sTTIs. Accordingly, the UE 115 may begin UL transmission four sTTIs after receiving a grant for UL transmission (e.g., transmitting during UL sTTI 625-a, which is four sTTIs after a grant received during DL sTTI 620-a). In some examples, the UE 115 may be scheduled based on an n+6 timing delay, where an UL timing delay is associated with a delay of 6 sTTIs. Accordingly, the UE 115 may begin UL transmission six sTTIs after receiving a grant for UL transmission (not shown). In various examples, an n+4 timing delay or an n+6 timing delay may be configured with sTTIs having a duration of one slot, or a duration of two symbols.

Figure 7:
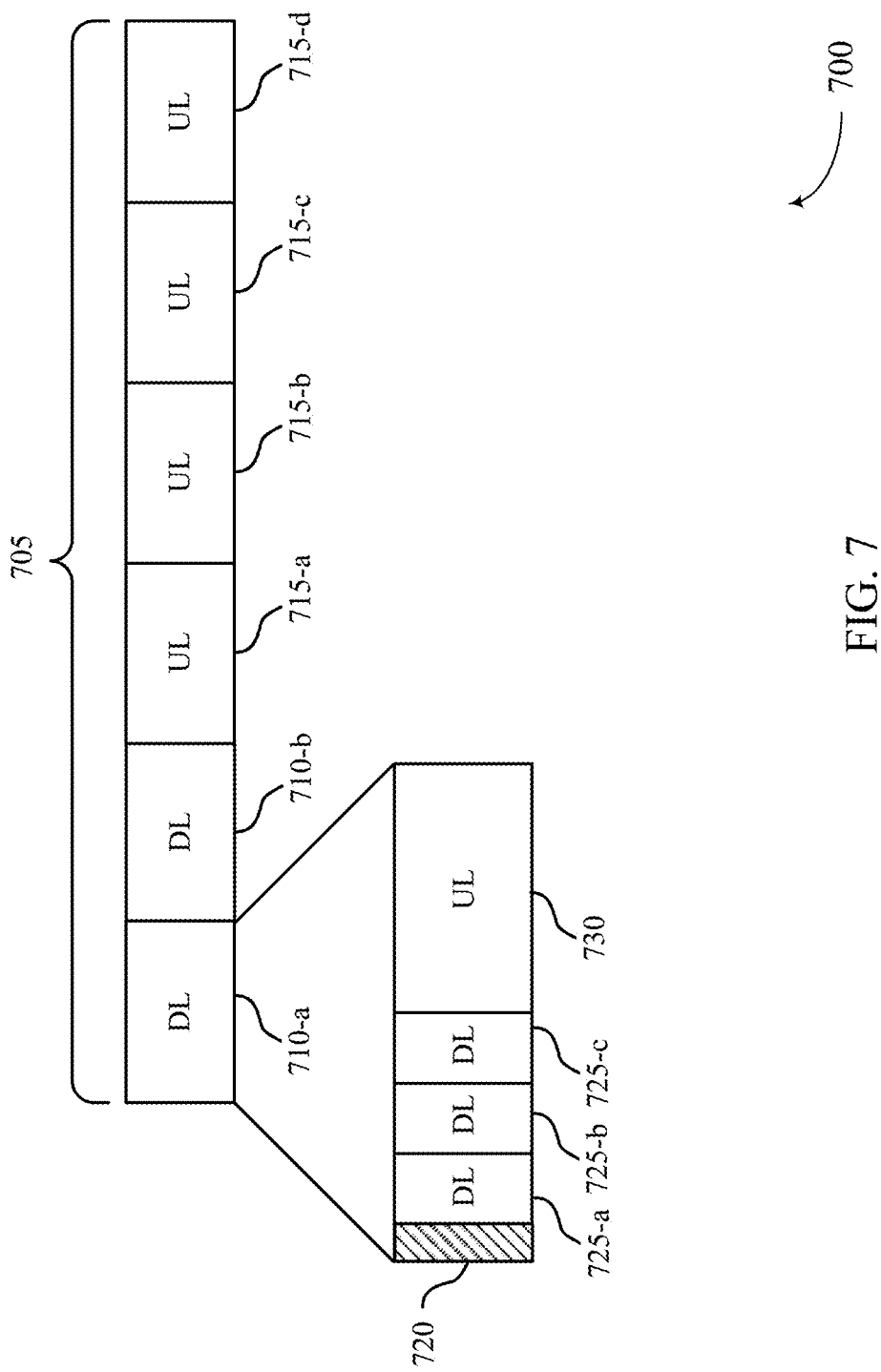
FIG. 7 illustrates an example of a shortened transmission time interval configuration that supports latency reduction in unlicensed spectrum in accordance with aspects of the present disclosure.

FIG. 7 illustrates an example of a sTTI configuration 700 for latency reduction in unlicensed spectrum in accordance with aspects of the present disclosure. A base station 105 may configure a subframe to contain UL sTTIs and DL sTTIs. A set of sTTIs including both UL and DL sTTIs may correspond to a same time period as a single subframe (e.g., a nominal or baseline TTI according to a different time configuration of the same wireless network). A UE 115 may be scheduled for an UL transmission and transmit UL information in a subframe. The aforementioned base station 105 and UE 115 are not shown, and may be examples of a base station 105 or UE 115 as described with reference to FIGS. 1 and 2.

In some cases, the base station 105 may configure TxOp 705 with DL subframes 710-a and 710-b, as well as UL subframes 715-a, 715-b, 715-c, and 715-d. DL subframes 710 and UL subframes 715 may have a common duration. In some cases, a subframe may be split into DL sTTIs 725 and UL sTTIs 730. The base station 105 may schedule multiple transmission directions in a single subframe (e.g., a DL subframe 710 may include DL sTTIs 725 and UL sTTIs 730). For example, the base station 105 may split DL subframe 710-a into a control message 720, DL sTTIs 725-a, 725-b, and 725-c, and an UL sTTI 730. In some examples, the control message 720 may span one symbol period or a fractional symbol period (e.g., half of a symbol period), DL sTTIs 725-a, 725-b, and 725-c may each span two symbol periods, and the UL sTTI 730 may span a 1-slot time period.

The base station 105 may schedule the UE 115 for an UL transmission in an UL sTTI 730 of the same subframe. In some examples, the UE 115 may generate a CSI report (e.g., based on pilot signals during the DL sTTI 725-a, 725-b, and/or 725-c) and transmit the CSI report in same subframe (e.g., during the UL sTTI 730). In some cases, splitting DL subframe 710-a into UL sTTIs 730 and DL sTTIs 725 may increase a number of opportunities for SRS transmissions. The additional SRS opportunities may allow a greater number of UEs 115 to transmit SRS within a time period. The UE 115 may perform an LBT procedure between each switch from a DL sTTI 725 to an UL sTTI 730. In some cases, the base station 105 may perform multiple LBT procedures during a single TxOp 705. The base station 105 may identify and select unoccupied bands for future transmissions during the LBT procedures. The base station 105 may tune its bandwidth after each LBT procedure.

Figure 8:
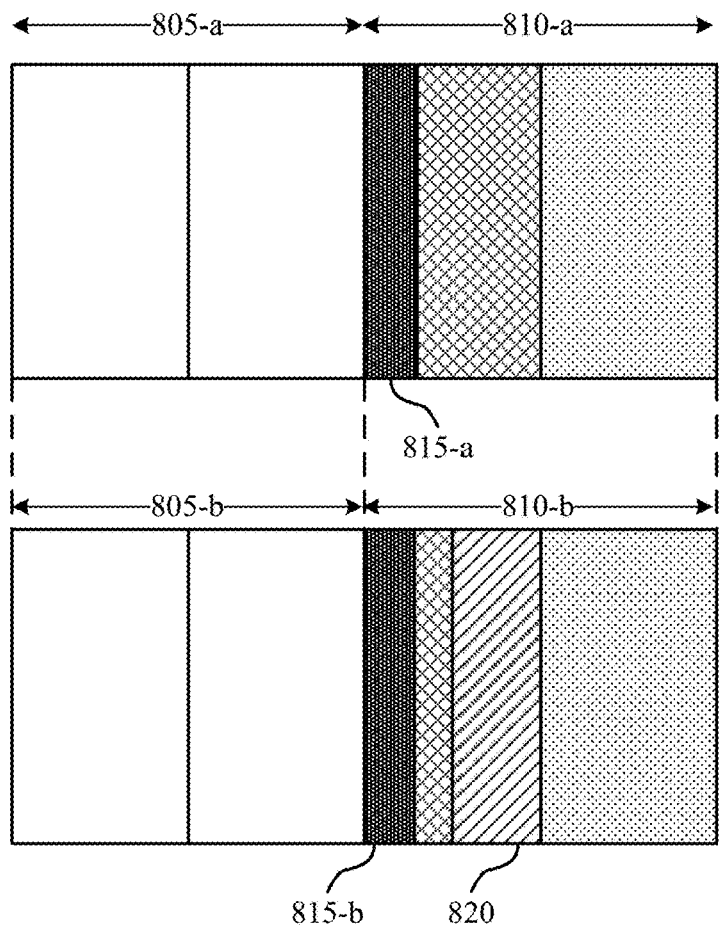
FIG. 8 is an illustration of examples of LBT procedure configurations for latency reduction in unlicensed spectrum in accordance with aspects of the present disclosure.

FIG. 8 is an illustration 800 of examples of LBT procedure configurations for latency reduction in unlicensed spectrum in accordance with aspects of the present disclosure. A UE 115 may perform an LBT procedure when switching from a DL sTTI to an UL sTTI. The UE 115 may transmit during a portion of the resources used for the LBT procedure. The UE 115 may be in communication with a base station 105. The aforementioned base station 105 and UE 115 are not shown, and may be examples of a base station 105 or UE 115 as described with reference to FIGS. 1 and 2.

In some examples, a UE 115 may perform LBT procedure 815-a during a transition from DL sTTI 805-a to UL sTTI 810-a. The UE 115 may perform LBT procedure 815-a during a first symbol of UL sTTI 810-a. In some examples, the UE 115 may drop the transmission resources and refrain from transmitting during the rest of the first symbol period of UL sTTI 810-a. In other examples, the UE 115 may perform LBT procedure 815-b after switching from DL sTTI 805-b to UL sTTI 810-b, and the UE 115 may transmit for an uplink half-symbol 820 of UL sTTI 810-b after LBT procedure 815-b (e.g., dropping transmission resources of the first half-symbol period that follow the LBT procedure 815-b). In some examples, an LBT procedure 815 may have a duration of approximately 25 microseconds. Transmitting for the uplink half-symbol 820 may provide a delay between DL sTTI 805-b and UL sTTI 810-b while providing increased throughput.

For example, the UE 115 may be allocated 35.5 microseconds at the beginning of UL sTTI 810-b prior to transmitting during the UL sTTI 810-b, instead of the delay due to a LBT procedure 815 (e.g., 25 microseconds) or the entire symbol period (e.g., 66.7 microseconds). In some examples, a dropped transmission period may give the UE 115 time to prepare for UL transmission. In some examples, the UE 115 may begin UL transmissions in advance, which may provide the base station 105 more time to switch from an UL mode to a DL mode. For example, the UE 115 may start UL transmissions 10.5 microseconds in advance such that the base station 105 has more time for switching transmission modes. Transmitting during the uplink half-symbol 820 may involve additional overhead for the half-symbol transmission. Therefore, the number of switching points in a subframe may be configurable or determined based on a tolerable overhead of the wireless communications system.

Figure 9:
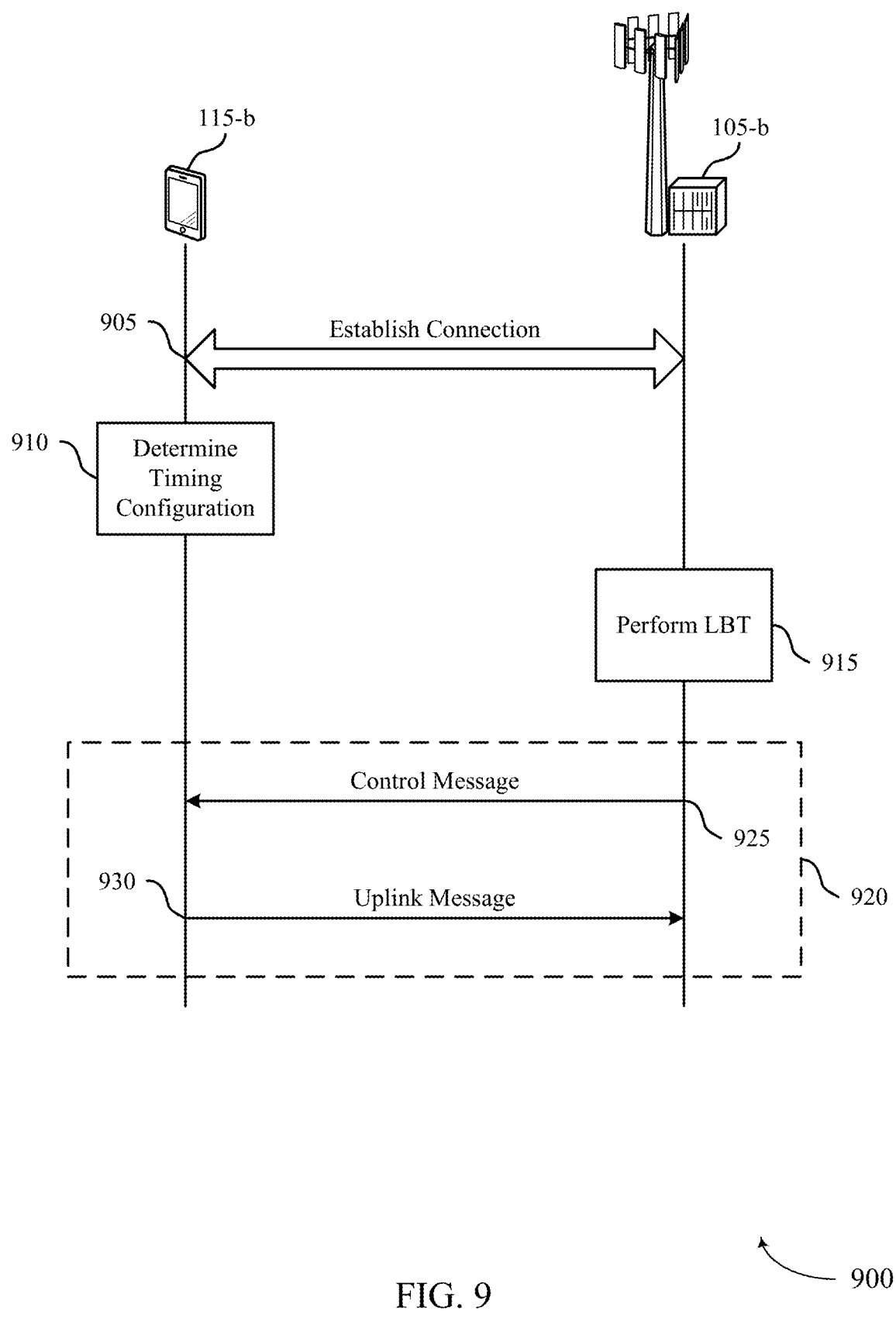
FIG. 9 illustrates an example of a process flow that supports latency reduction in unlicensed spectrum in accordance with aspects of the present disclosure.

FIG. 9 illustrates an example of a process flow 900 for latency reduction in unlicensed spectrum in accordance with aspects of the present disclosure. Process flow 900 may include base station 105-b and UE 115-b which may be examples of a base station 105 and a UE 115 as described herein with reference to FIGS. 1 and 2. UE 115-b and base station 105-b may communicate using configurations for reduced delay between DL transmission and UL transmission.

At 905, base station 105-b and UE 115-b may establish a wireless connection for transmission using an unlicensed radio frequency spectrum band. The connection may support a first timing configuration and a second timing configuration for the unlicensed radio frequency spectrum band.

At 910, UE 115-b may determine whether to use the first timing configuration or the second timing configuration for communication in the unlicensed frequency spectrum band with base station 105-b. The first UL timing configuration may have a first time difference (e.g., 4 TTIs, 4 subframes, etc.) between a DL communication and a responsive UL communication, and the second timing configuration may have a second difference (e.g., 3 TTIs, 3 subframes, etc.) between the DL communication and the responsive UL communication. The second time difference may be less than the first time difference. In some cases, the determination may be based on the capabilities of UE 115-b. In some cases, UE 115-b may determine whether to use a first TTI duration, a second TTI duration, or both, for the communication in the unlicensed frequency spectrum band with base station 105-b. The second TTI duration may be less than the first TTI duration. In some examples, base station 105-b may also determine whether to use the first timing configuration or the second timing configuration. Base station 105-b may also determine whether to use the first TTI duration, the second TTI duration, or both.

At 915, base station 105-b may perform an LBT procedure. Base station 105-b may schedule UE 115-b for a TxOp 920 if base station 105-b does not identify interfering transmissions above an interference threshold based on the LBT procedure.

At 925, base station 105-b may transmit a control message during the TxOp 920 of the unlicensed radio frequency spectrum band to UE 115-b. In some cases, the control message is received by UE 115-b using the second TTI duration (e.g., a shorter TTI duration than the first TTI duration). In some examples, the control message may be a CPDCCH message and indicates a reference measurement resource (e.g., a reference measurement TTI) for generating a CSI report.

At 930, UE 115-b may transmit an UL message to base station 105-b during the TxOp 920 in response to the control message. In some cases, the UL message may be transmitted by UE 115-b using the first TTI duration (e.g., a longer TTI duration than the second TTI duration). In other examples, the UL message may be transmitted using the second TTI duration. In some cases, UE 115-b may transmit a CSI report in the UL message based on either the first or second timing configuration. In some examples, the CSI report may be based on a reference measurement TTI, where the reference measurement TTI may be based on the first or second timing configuration. In some examples, the reference measurement TTI may precede the UL message by a threshold number of TTIs, where the number of TTIs may be based on the first or second timing configuration. UE 115-*b* may receive an indication of the reference measurement TTI from base station 105-*b*. In other examples, UE 115-*b* may identify the reference measurement TTI based on a subband of the unlicensed radio frequency spectrum band. UE 115-*b* may transmit the UL message of a carrier within the unlicensed radio frequency spectrum band, and the subband may span a bandwidth that is less than a bandwidth of the carrier.

Figure 10:
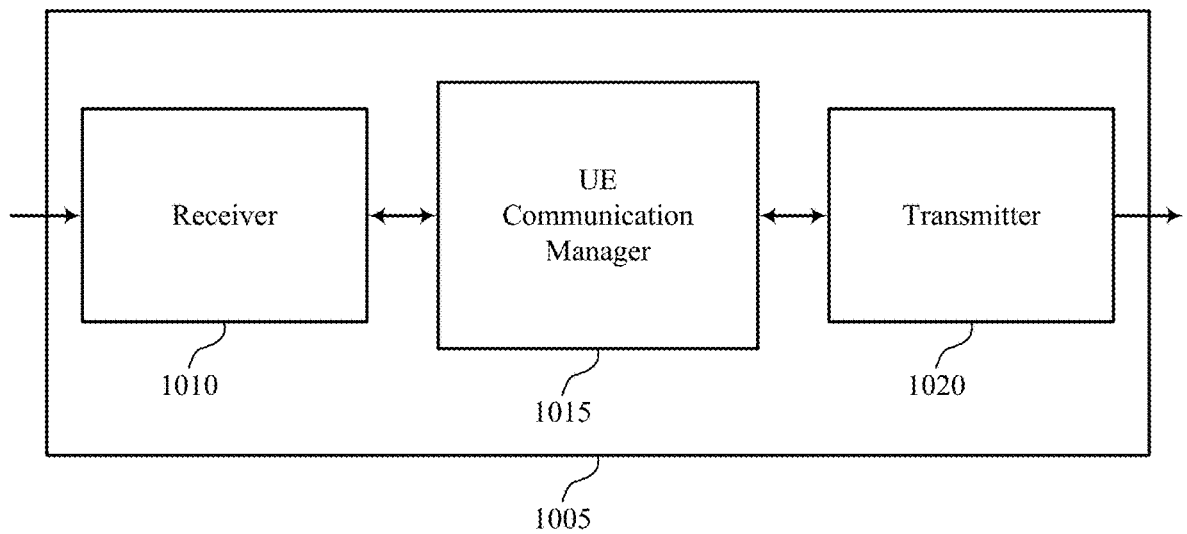
FIGS. 10 through 12 show block diagrams of a device or devices that support latency reduction in unlicensed spectrum in accordance with aspects of the present disclosure.

FIG. 10 shows a block diagram 1000 of a device 1005 that supports latency reduction in accordance with aspects of the present disclosure. Device 1005 may be an example of aspects of a UE 115 as described with reference to FIGS. 1 and 2. Device 1005 may include a receiver 1010, a UE communication manager 1015, and a transmitter 1020. Device 1005 may also include a processor. Each of these components may be in communication with one another (e.g., via one or more buses). In some examples, the device 1005 may support latency in accordance with LTE frame structure 3 (FS3).

The receiver 1010 may receive information such as packets, user data, or control information associated with various information channels (e.g., control channels, data channels, and information related to latency reduction in unlicensed spectrum, etc.). Information may be passed on to other components of the device. The receiver 1010 may be an example of aspects of the transceiver 1335 described with reference to FIG. 13. The receiver 1010 may include a single antenna, or it may include a set of antennas. The receiver 1010 may receive a control message from a base station 105 during a TxOp of the unlicensed radio frequency spectrum band.

The UE communication manager 1015 may be an example of aspects of the UE communication manager 1315 described with reference to FIG. 13. In some examples, the UE communication manager 1015 may determine whether to use a first timing configuration or a second timing configuration for communication in an unlicensed radio frequency spectrum band, the first timing configuration having a first time difference between a DL communication and a responsive UL communication, and the second timing configuration having a second time difference between the DL communication and the responsive UL communication, the second time difference being less than the first time difference. In some examples, the UE communication manager 1015 may determine whether to use a first TTI duration, a second TTI duration, or both, for communication in an unlicensed radio frequency spectrum band, where the second TTI duration is less than the first TTI duration. In some examples, the UE communication manager 1015 may receive (e.g., in cooperation with the receiver 1010) a control message from a base station 105 during a TxOp of the unlicensed radio frequency spectrum band using the first TTI duration or the second TTI duration.

The transmitter 1020 may transmit signals generated by other components of the device (e.g., the UE communication manager 1015). The transmitter 1020 may transmit an UL message during a TxOp in response to a control message received during the TxOp, where the UL message is transmitted according to an UL timing that is based on whether the control message was received using the first TTI duration or the second TTI duration. Additionally or alternatively, the transmitter 1020 may transmit an UL message during the TxOp in response to the control message based on the first timing configuration or the second timing configuration. In some examples, the transmitter 1020 may be collocated with a receiver 1010 in a transceiver module. For example, the transmitter 1020 may be an example of aspects of the transceiver 1335 described with reference to FIG. 13. The transmitter 1020 may include a single antenna, or it may include a set of antennas.

Figure 11:
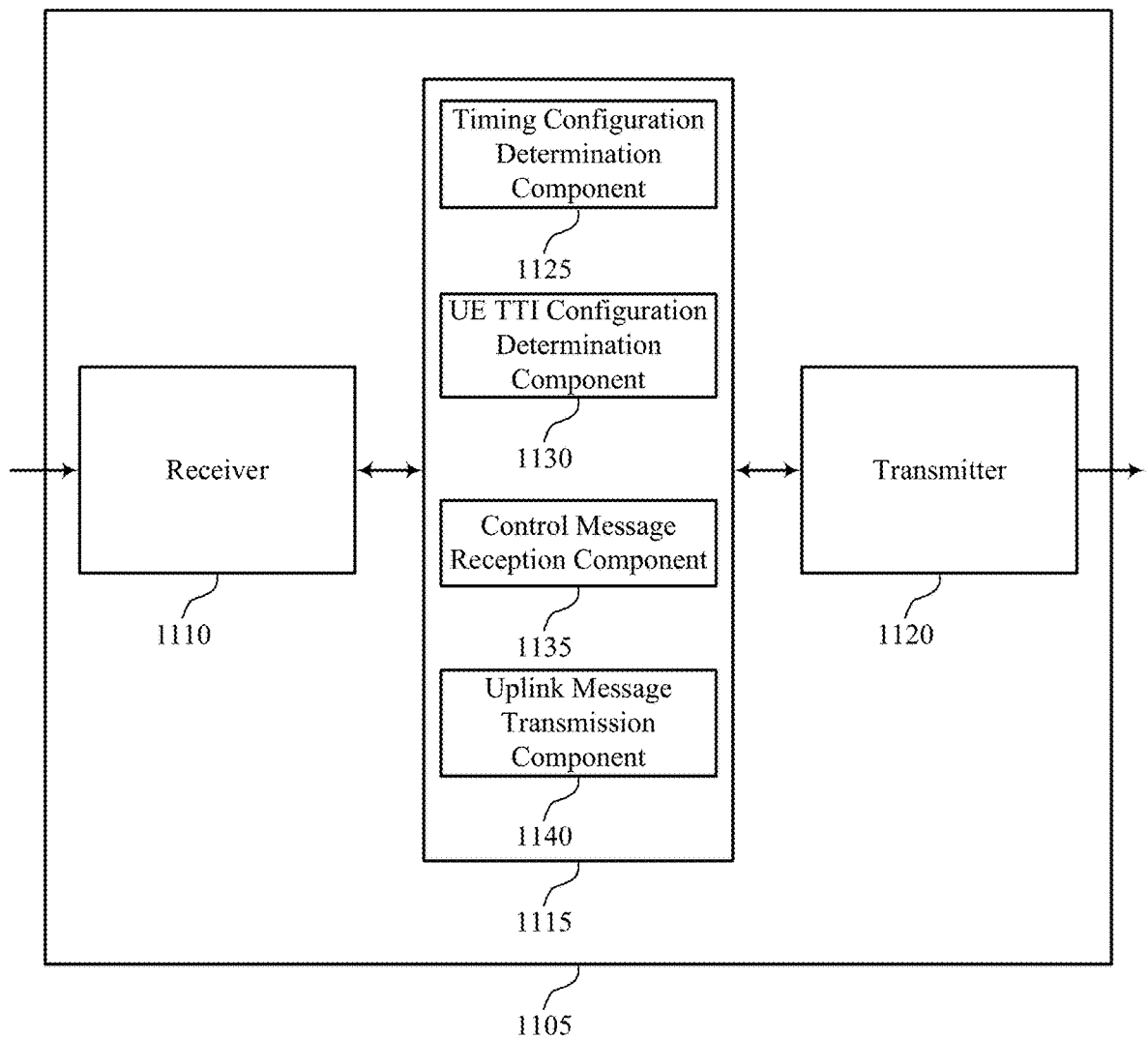

FIG. 11 shows a block diagram 1100 of a device 1105 that supports latency reduction in unlicensed spectrum in accordance with aspects of the present disclosure. Device 1105 may be an example of aspects of a device 1005 or a UE 115 as described with reference to FIGS. 1, 2, and 10. Device 1105 may include a receiver 1110, a UE communication manager 1115, and a transmitter 1120. Device 1105 may also include a processor. Each of these components may be in communication with one another (e.g., via one or more buses).

The receiver 1110 may receive information such as packets, user data, or control information associated with various information channels (e.g., control channels, data channels, and information related to latency reduction in unlicensed spectrum, etc.). Information may be passed on to other components of the device. The receiver 1110 may be an example of aspects of the transceiver 1335 described with reference to FIG. 13. The receiver 1110 may include a single antenna, or it may include a set of antennas The UE communication manager 1115 may be an example of aspects of the UE communication manager 1315 described with reference to FIG. 13. The UE communication manager 1115 may include a timing configuration determination component 1125, a UE TTI configuration determination component 1130, a control message reception component 1135, and a UL message transmission component 1140.

The timing configuration determination component 1125 may determine whether to use a first timing configuration or a second timing configuration for communication in an unlicensed radio frequency spectrum band, the first timing configuration having a first time difference between a DL communication and a responsive UL communication, and the second timing configuration having a second time difference between the DL communication and the responsive UL communication, the second time difference being less than the first time difference. In some cases, the determining whether to use the first timing configuration or the second timing configuration is based on a UE capability.

The UE TTI configuration determination component 1130 may determine whether to use a first TTI duration, a second TTI duration, or both, for communication in an unlicensed radio frequency spectrum band, where the second TTI duration is less than the first TTI duration. In some cases, a TTI of the first TTI duration includes one or more UL TTIs of the second TTI duration, one or more DL TTIs of the second TTI duration, or both. In some examples, the UE TTI configuration determination component 1130 may receive (e.g., in cooperation with the receiver 1110) a message from the base station 105 that indicates whether a control message is to be received using the second TTI duration, whether the UL message is to be transmitted using the second TTI duration, or both. In some examples, the UE TTI configuration determination component 1130 may receive an indication of a number of symbol periods within the second TTI duration. In some examples, the UE TTI configuration determination component 1130 may receive an indication of a TTI configuration for one or more UL messages in a CPDCCH.

The control message reception component 1135 may receive (e.g., in cooperation with the receiver 1110) a control message from a base station 105 during a TxOp of the unlicensed radio frequency spectrum band using the first TTI duration or the second TTI duration. In some cases, the control message is received using the second TTI duration. In some cases, the control message is a CPDCCH message and indicates a reference measurement resource for generating a CSI report.

The UL message transmission component 1140 may transmit (e.g., in cooperation with the transmitter 1120) an UL message during the TxOp in response to the control message according to an UL timing that is based on whether the control message was received using the first TTI duration or the second TTI duration. In some cases, the UL message is transmitted after a response delay of four TTIs of the second TTI duration or six TTIs of the second duration. In various examples the UL message may be transmitted using the first TTI duration or transmitted using the second TTI duration The transmitter 1120 may transmit signals generated by other components of the device (e.g., the UE communication manager 1115, including any of its subcomponents). In some examples, the transmitter 1120 may be collocated with a receiver 1110 in a transceiver module. For example, the transmitter 1120 may be an example of aspects of the transceiver 1335 described with reference to FIG. 13. The transmitter 1120 may include a single antenna, or it may include a set of antennas.

Figure 12:
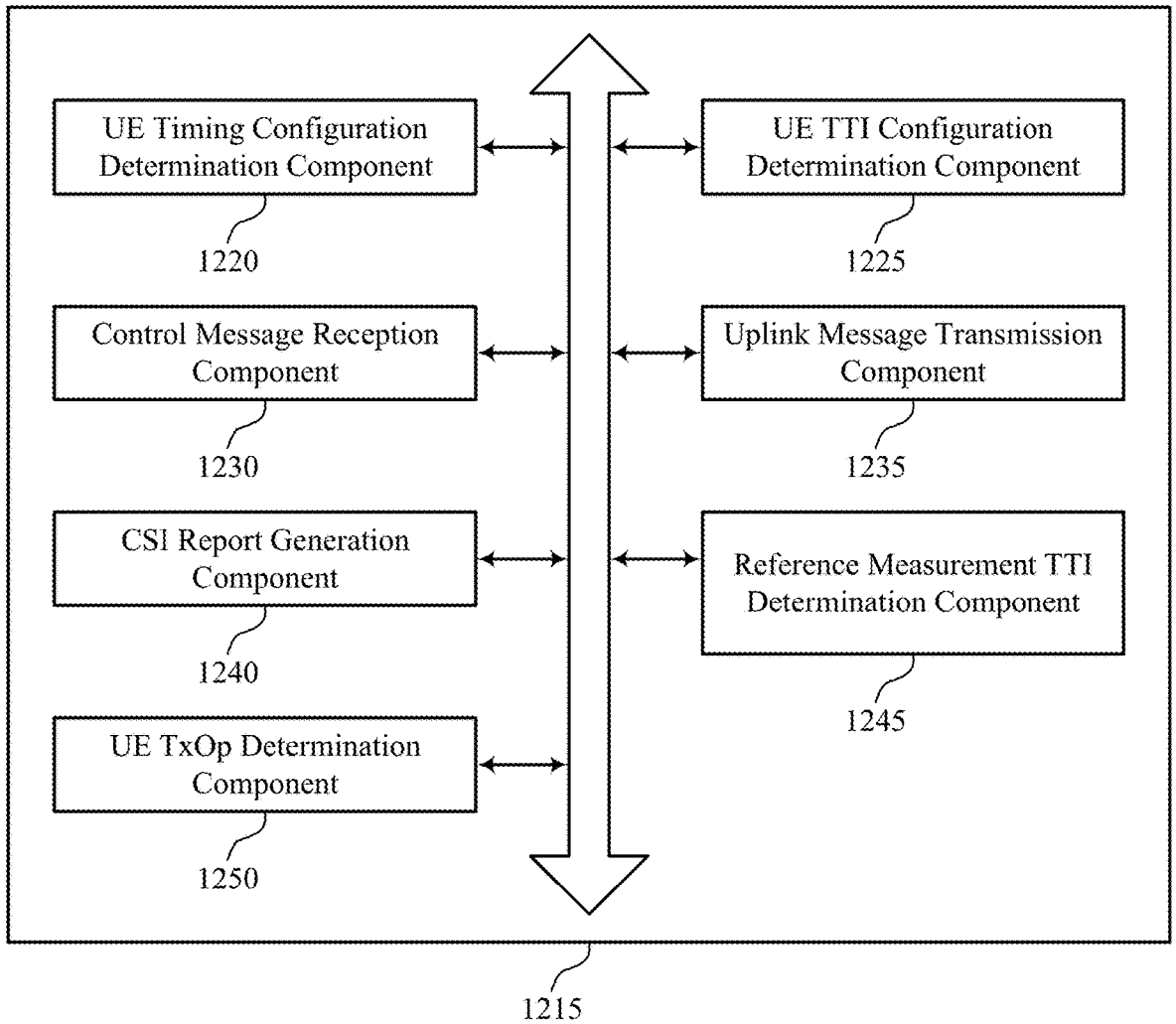

FIG. 12 shows a block diagram 1200 of a UE communication manager 1215 that supports latency reduction in unlicensed spectrum in accordance with aspects of the present disclosure. The UE communication manager 1215 may be an example of aspects of a UE communication manager 1015, a UE communication manager 1115, or a UE communication manager 1315 described with reference to FIGS. 10, 11, and 13. The UE communication manager 1215 may include a UE timing configuration determination component 1220, a UE TTI configuration determination component 1225, a control message reception component 1230, a UL message transmission component 1235, a CSI report generation component 1240, a reference measurement TTI determination component 1245, and a UE TxOp determination component 1250. Each of these modules may communicate, directly or indirectly, with one another (e.g., via one or more buses).

The UE timing configuration determination component 1220 may determine whether to use a first timing configuration or a second timing configuration for communication in an unlicensed radio frequency spectrum band, the first timing configuration having a first time difference between a DL communication and a responsive UL communication, and the second timing configuration having a second time difference between the DL communication and the responsive UL communication, the second time difference being less than the first time difference. In some cases, determining whether to use the first timing configuration or the second timing configuration is based on a UE capability. In some cases, the second timing configuration includes an UL response delay of three subframes.

The UE TTI configuration determination component 1225 may determine whether to use a first TTI duration, a second TTI duration, or both, for communication in an unlicensed radio frequency spectrum band, where the second TTI duration is less than the first TTI duration. In some cases, a TTI of the first TTI duration includes one or more UL TTIs of the second TTI duration, one or more DL TTIs of the second TTI duration, or both. In some examples, the UE TTI configuration determination component 1225 may receive (e.g., in cooperation with a receiver) a message from the base station 105 that indicates whether the control message is to be received using the second TTI duration, whether the UL message is to be transmitted using the second TTI duration, or both. In some examples, the UE TTI configuration determination component 1225 may receive (e.g., in cooperation with a receiver) an indication of a number of symbol periods within the second TTI duration. In some examples, the UE TTI configuration determination component 1225 may receive (e.g., in cooperation with a receiver) an indication of a TTI configuration for one or more UL messages in a CPDCCH.

The control message reception component 1230 may receive (e.g., in cooperation with a receiver) a control message from a base station 105 during a TxOp of the unlicensed radio frequency spectrum band using the first TTI duration or the second TTI duration. In some cases, the control message is received using the second TTI duration. In some cases, the control message is a CPDCCH message and indicates a reference measurement resource for generating a CSI report.

UL message transmission component 1235 may transmit (e.g., in cooperation with a transmitter) an UL message during the TxOp in response to the control message according to an UL timing that is based on whether the control message was received using the first TTI duration or the second TTI duration. In some cases, the UL message is transmitted after a response delay of four TTIs of the second TTI duration or six TTIs of the second TTI duration. In various examples the UL message may be transmitted using the first TTI duration or transmitted using the second TTI duration. In some cases, the UL message includes a CSI report that is based on the first timing configuration or the second timing configuration.

The CSI report generation component 1240 may generate a CSI report based on a reference measurement TTI. In some cases, the CSI report may be based on a reference measurement TTI, and the reference measurement TTI may be based on the first timing configuration or the second timing configuration. In some cases, the CSI report includes an aperiodic CSI report, and the indication may be received in a grant or a CPDCCH.

The reference measurement TTI determination component 1245 may receive (e.g., in cooperation with a receiver) an indication of the reference measurement TTI from the base station 105, where the reference measurement TTI is identified based on the indication. In some cases, the reference measurement TTI precedes a UL message transmission by a threshold number of TTIs that is based on the first timing configuration or the second timing configuration. In some cases, the reference measurement TTI is identified based on a subband of the unlicensed radio frequency spectrum band, and a UL message is transmitted on a carrier within the unlicensed radio frequency spectrum band, where the subband includes a bandwidth that is less than a bandwidth of the carrier. In some cases, the reference measurement TTI identified by a set of reference pilots arranged in a configuration having a first density that is greater than a second density of a CRS configuration.

The UE TxOp determination component 1250 may perform a LBT procedure during a first UL symbol of an UL TTI of the second TTI duration following a transition from a DL TTI of the second TTI duration to the UL TTI of the second TTI duration and receive an indication of a DL TTI of the second TTI duration from the base station 105. In some cases, a first UL TTI of the TxOp is separated from a last DL TTI of the TxOp by a gap period.

Figure 13:
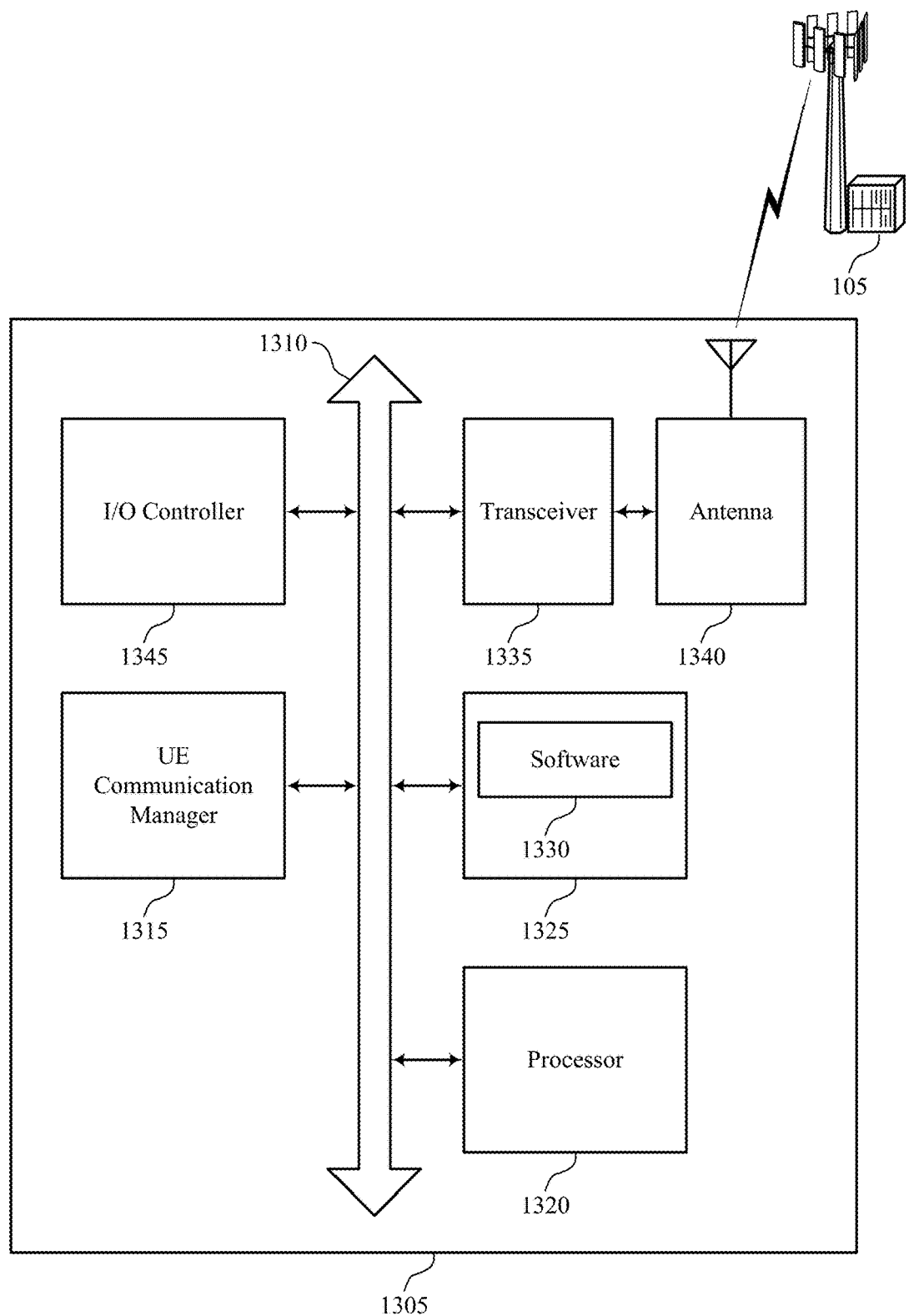
FIG. 13 illustrates a block diagram of a system, including a UE that supports latency reduction in unlicensed spectrum in accordance with aspects of the present disclosure.

FIG. 13 shows a diagram of a system 1300 including a device 1305 that supports latency reduction in unlicensed spectrum in accordance with aspects of the present disclosure. Device 1305 may be an example of or include the components of device 1005, device 1105, or a UE 115 as described in the present disclosure, e.g., with reference to FIGS. 1, 2, 10 and 11. Device 1305 may include components for bi-directional voice and data communications including components for transmitting and receiving communications, including a UE communication manager 1315, a processor 1320, memory 1325, software 1330, a transceiver 1335, one or more antenna(s) 1340, and an I/O controller 1345. These components may be in electronic communication via one or more busses (e.g., bus 1310). Device 1305 may communicate wirelessly with one or more base stations 105.

Processor 1320 may include an intelligent hardware device, (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, processor 1320 may be configured to operate a memory array using a memory controller. In other cases, a memory controller may be integrated into the processor 1320. Processor 1320 may be configured to execute computer-readable instructions stored in a memory to perform various functions (e.g., functions or tasks supporting latency reduction in unlicensed spectrum).

Memory 1325 may include random access memory (RAM) and read-only memory (ROM). The memory 1325 may store computer-readable, computer-executable software 1330 including instructions that, when executed (e.g., by the processor 1320), cause the device 1305 to perform various functions described herein. In some cases, the memory 1325 may contain, among other things, a basic input/output system (BIOS) which may control basic hardware and/or software operation such as the interaction with peripheral components or devices.

Software 1330 may include code to implement aspects of the present disclosure, including code to support latency reduction in unlicensed spectrum. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas 1340, wired links, or wireless links as described in the present disclosure. For example, the transceiver 1335 may represent a wireless transceiver and may communicate bi-directionally with another wireless transceiver. The transceiver 1335 may also include a modem to modulate packets and provide the modulated packets to the antennas 1340 for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

The I/O controller 1345 may manage input and output signals for device 1305. I/O controller 1345 may also manage peripherals not integrated into device 1305. In some cases, I/O controller 1345 may represent a physical connection or port to an external peripheral. In some cases, I/O controller 1345 may utilize an operating system such as iOS®, ANDROID®, MS-DOS®, MS-WINDOWS®, OS/2®, UNIX®, LINUX®, or another known operating system.

Figure 14:
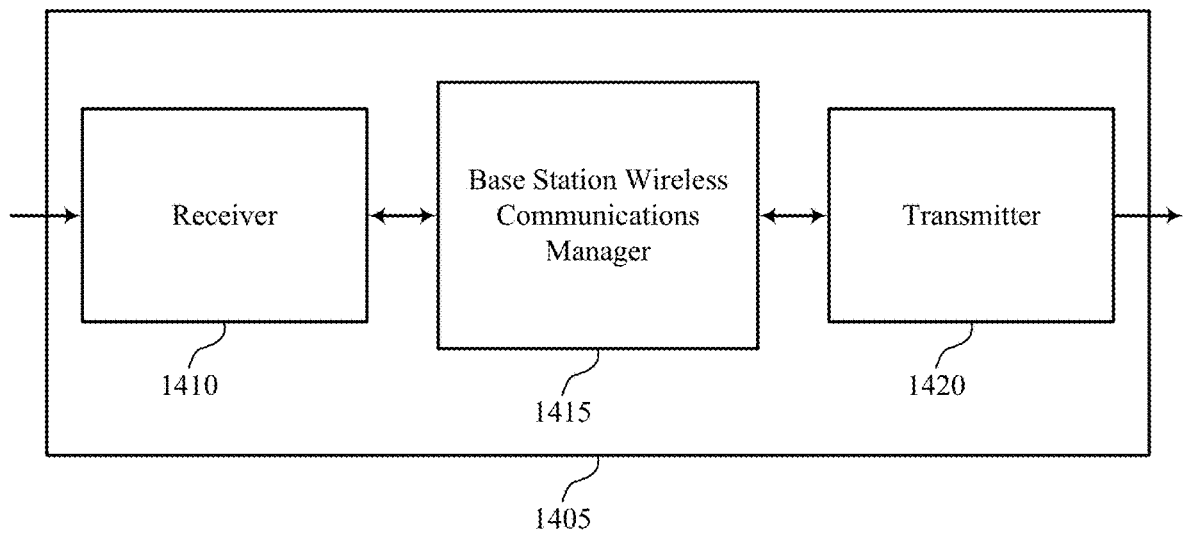
FIGS. 14 through 16 show block diagrams of a device or devices that support latency reduction in unlicensed spectrum in accordance with aspects of the present disclosure.

FIG. 14 shows a block diagram 1400 of a device 1405 that supports latency reduction in unlicensed spectrum in accordance with aspects of the present disclosure. Device 1405 may be an example of aspects of a base station 105 as described with reference to FIGS. 1 and 2. Device 1405 may include a receiver 1410, a base station wireless communications manager 1415, and a transmitter 1420. Device 1405 may also include a processor. Each of these components may be in communication with one another (e.g., via one or more buses).

The receiver 1410 may receive information such as packets, user data, or control information associated with various information channels (e.g., control channels, data channels, and information related to latency reduction in unlicensed spectrum, etc.). Information may be passed on to other components of the device. The receiver 1410 may be an example of aspects of the transceiver 1735 described with reference to FIG. 17. The receiver 1410 may include a single antenna, or it may include a set of antennas In some examples, the receiver 1410 may receive (e.g., in cooperation with the base station wireless communications manager) an UL message during a TxOp in response to a control message based on a first timing configuration or a second timing configuration. In some examples, the receiver 1410 may receive an UL message during a TxOp in response to a control message according to an UL timing that is based on whether the control message was transmitted using a first TTI duration or a second TTI duration. In some cases, the UL message includes a CSI report that is based on the first timing configuration or the second timing configuration.

The base station wireless communications manager 1415 may be an example of aspects of the base station wireless communications manager 1715 described with reference to FIG. 17. In some examples, the base station wireless communications manager 1415 may determine whether to use a first timing configuration or a second timing configuration for communication in an unlicensed radio frequency spectrum band, the first timing configuration having a first time difference between a DL communication and a responsive UL communication, and the second timing configuration having a second time difference between the DL communication and the responsive UL communication, the second time difference being less than the first time difference. In some examples, the base station wireless communications manager 1415 may determine whether to use a first TTI duration, a second TTI duration, or both, for communication in an unlicensed radio frequency spectrum band. In some examples, the base station wireless communications manager 1415 may transmit (e.g., in cooperation with the transmitter 1420) a control message from a base station 105 during a TxOp of the unlicensed radio frequency spectrum band using the first TTI duration or the second TTI duration.

Transmitter 1420 may transmit signals generated by other components of the device (e.g., the base station wireless communications manager 1415). In some examples, the transmitter 1420 may be collocated with a receiver 1410 in a transceiver module. For example, the transmitter 1420 may be an example of aspects of the transceiver 1735 described with reference to FIG. 17. The transmitter 1420 may include a single antenna, or it may include a set of antennas. Transmitter 1420 may transmit a control message to a UE 115 during a TxOp of the unlicensed radio frequency spectrum band.

Figure 15:
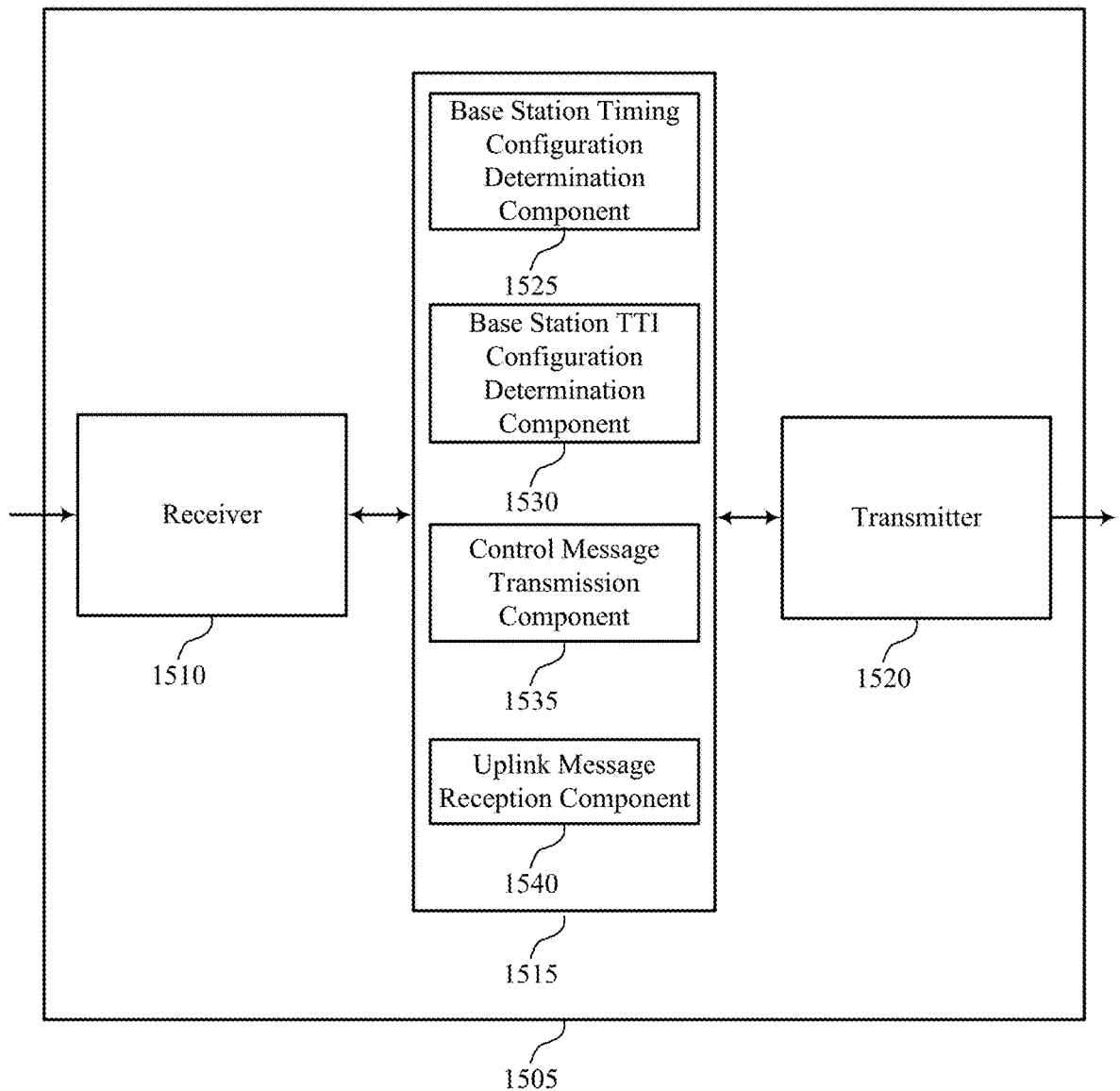

FIG. 15 shows a block diagram 1500 of a device 1505 that supports latency reduction in unlicensed spectrum in accordance with aspects of the present disclosure. Device 1505 may be an example of aspects of a device 1405 or a base station 105 as described with reference to FIGS. 1, 2, and 14. Device 1505 may include a receiver 1510, a base station wireless communications manager 1515, and a transmitter 1520. Device 1505 may also include a processor. Each of these components may be in communication with one another (e.g., via one or more buses).

The receiver 1510 may receive information such as packets, user data, or control information associated with various information channels (e.g., control channels, data channels, and information related to latency reduction in unlicensed spectrum, etc.). Information may be passed on to other components of the device. The receiver 1510 may be an example of aspects of the transceiver 1735 described with reference to FIG. 17. The receiver 1510 may include a single antenna, or it may include a set of antennas.

The base station wireless communications manager 1515 may be an example of aspects of the base station wireless communications manager 1715 described with reference to FIG. 17. Base station wireless communications manager 1515 may include a base station timing configuration determination component 1525, a base station TTI configuration determination component 1530, a control message transmission component 1535, and an UL message reception component 1540.

The base station timing configuration determination component 1525 may determine whether to use a first timing configuration or a second timing configuration for communication in an unlicensed radio frequency spectrum band, the first timing configuration having a first time difference between a DL communication and a responsive UL communication, and the second timing configuration having a second time difference between the DL communication and the responsive UL communication, the second time difference being less than the first time difference. In some cases, determining whether to use the first timing configuration or the second timing configuration is based on a capability of a UE 115.

The base station TTI configuration determination component 1530 may determine whether to use a first TTI duration, a second TTI duration, or both, for communication in an unlicensed radio frequency spectrum band. In some cases, a TTI of the first TTI duration includes one or more UL TTIs of the second TTI duration, one or more DL TTIs of the second TTI duration, or both. In some examples, the base station TTI configuration determination component 1530 may transmit (e.g., in cooperation with the transmitter 1520) a message to the UE 115 that indicates whether the control message is to be transmitted using the second TTI duration, whether the UL message is to be received using the second TTI duration, or both. In some examples, the base station TTI configuration determination component 1530 may transmit (e.g., in cooperation with the transmitter 1520) an indication of a number of symbol periods within the second TTI duration. In some examples, the base station TTI configuration determination component 1530 may transmit (e.g., in cooperation with the transmitter 1520) an indication of a TTI configuration for one or more UL messages in a CPDCCH.

The control message transmission component 1535 may transmit (e.g., in cooperation with the transmitter 1520) a control message from a base station 105 during a TxOp of the unlicensed radio frequency spectrum band using the first TTI duration or the second TTI duration. In some cases, the control message is transmitted using the second TTI duration. In some cases, the control message is a CPDCCH message and indicates a reference measurement resource for the UE 115 to generate a CSI report.

UL message reception component 1540 may receive (e.g., in cooperation with the receiver 1510) an UL message during the TxOp in response to the control message according to an UL timing that is based on whether the control message was transmitted using the first TTI duration or the second TTI duration. In some cases, the UL message is received after a response delay of four TTIs of the second TTI duration or six TTIs of the second TTI duration. In various examples the UL message may be received using the first TTI duration or received using the second TTI duration Transmitter 1520 may transmit signals generated by other components of the device (e.g., the base station wireless communication manager 1515, including any of its subcomponents). In some examples, the transmitter 1520 may be collocated with a receiver 1510 in a transceiver module. For example, the transmitter 1520 may be an example of aspects of the transceiver 1735 described with reference to FIG. 17. The transmitter 1520 may include a single antenna, or it may include a set of antennas.

Figure 16:
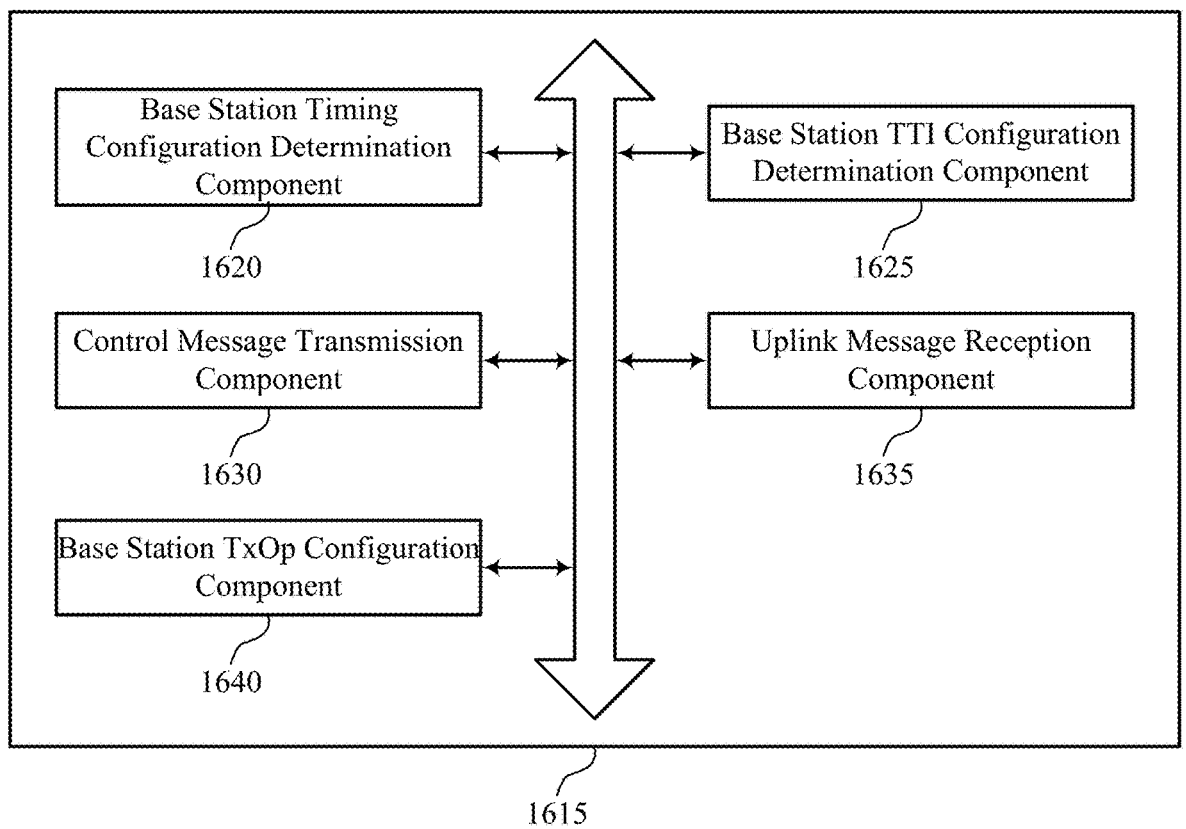

FIG. 16 shows a block diagram 1600 of a base station wireless communications manager 1615 that supports latency reduction in unlicensed spectrum in accordance with aspects of the present disclosure. The base station wireless communications manager 1615 may be an example of aspects of a base station wireless communications manager 1715 described with reference to FIGS. 14, 15, and 17. The base station wireless communications manager 1615 may include a base station timing configuration determination component 1620, a base station TTI configuration determination component 1625, a control message transmission component 1630, an UL message reception component 1635, and a base station TxOp configuration component 1640. Each of these modules may communicate, directly or indirectly, with one another (e.g., via one or more buses).

The base station timing configuration determination component 1620 may determine whether to use a first timing configuration or a second timing configuration for communication in an unlicensed radio frequency spectrum band, the first timing configuration having a first time difference between a DL communication and a responsive UL communication, and the second timing configuration having a second time difference between the DL communication and the responsive UL communication, the second time difference being less than the first time difference. In some cases, determining whether to use the first timing configuration or the second timing configuration is based on a capability of a UE 115.

The base station TTI configuration determination component 1625 may determine whether to use a first TTI duration, a second TTI duration, or both, for communication in an unlicensed radio frequency spectrum band. In some cases, a TTI of the first TTI duration includes one or more UL TTIs of the second TTI duration, one or more DL TTIs of the second TTI duration, or both. In some examples, the base station TTI configuration determination component 1625 may transmit (e.g., in cooperation with a transmitter) a message to the UE 115 that indicates whether the control message is to be transmitted using the second TTI duration, whether the UL message is to be received using the second TTI duration, or both. In some examples, the base station TTI configuration determination component 1625 may transmit (e.g., in cooperation with a transmitter) an indication of a number of symbol periods within the second TTI duration. In some examples, the base station TTI configuration determination component 1625 may transmit (e.g., in cooperation with a transmitter) an indication of a TTI configuration for one or more UL messages in a CPDCCH.

The control message transmission component 1630 may transmit (e.g., in cooperation with a transmitter) a control message from a base station 105 during a TxOp of the unlicensed radio frequency spectrum band using the first TTI duration or the second TTI duration. In some cases, the control message is transmitted using the second TTI duration. In some cases, the control message is a CPDCCH message and indicates a reference measurement resource for the UE to generate a CSI report.

UL message reception component 1635 may receive (e.g., in cooperation with a receiver) an UL message during the TxOp in response to the control message according to an UL timing that is based on whether the control message was transmitted using the first TTI duration or the second TTI duration. In some cases, the UL message is received after a response delay of four TTIs of the second TTI duration or six TTIs of the second TTI duration. In various examples the UL message may be received using the first TTI duration or received using the second TTI duration The base station TxOp configuration component 1640 may transmit (e.g., in cooperation with a transmitter) an indication of a DL TTI of the second TTI duration. In some cases, a first UL TTI of the TxOp is separated from a last DL TTI of the TxOp by a gap period.

Figure 17:
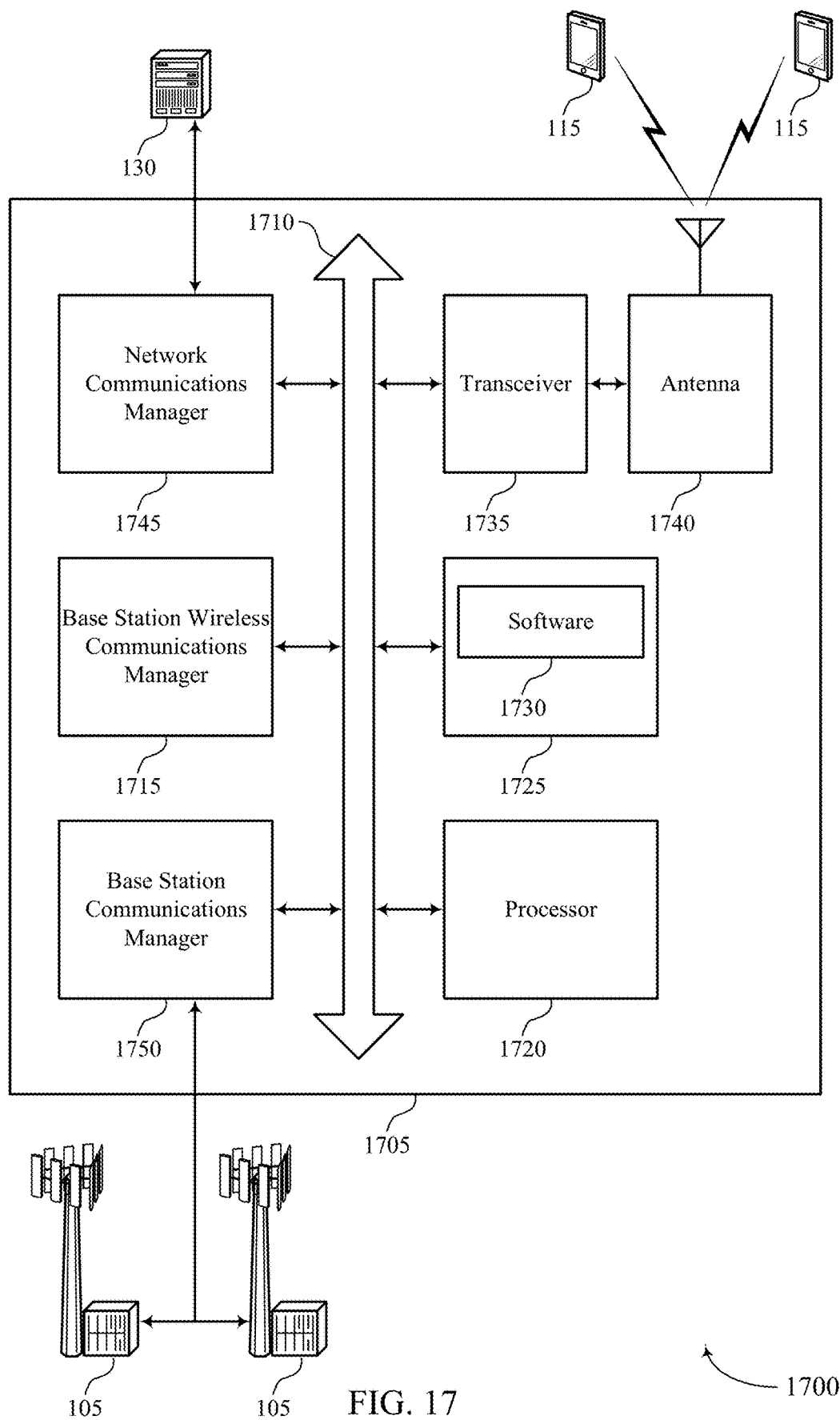
FIG. 17 illustrates a block diagram of a system, including a base station that supports latency reduction in unlicensed spectrum in accordance with aspects of the present disclosure.

FIG. 17 shows a diagram of a system 1700 including a device 1705 that supports latency reduction in unlicensed spectrum in accordance with aspects of the present disclosure. Device 1705 may be an example of or include the components of a base station 105 as described in the present disclosure, e.g., with reference to FIG. 1 or 2. Device 1705 may include components for bi-directional voice and data communications including components for transmitting and receiving communications, including a base station wireless communications manager 1715, a processor 1720, memory 1725, software 1730, a transceiver 1735, one or more antenna(s) 1740, a network communications manager 1745, and a base station communications manager 1750. These components may be in electronic communication via one or more busses (e.g., bus 1710). Device 1705 may communicate wirelessly with one or more UEs 115.

The processor 1720 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1720 may be configured to operate a memory array using a memory controller. In other cases, a memory controller may be integrated into processor 1720. Processor 1720 may be configured to execute computer-readable instructions stored in a memory to perform various functions (e.g., functions or tasks supporting latency reduction in unlicensed spectrum).

Memory 1725 may include RAM and ROM. The memory 1725 may store computer-readable, computer-executable software 1730 including instructions that, when executed (e.g., by the processor 1720), cause the device 1705 to perform various functions described herein. In some cases, the memory 1725 may contain, among other things, a BIOS which may control basic hardware and/or software operation such as the interaction with peripheral components or devices.

Software 1730 may include code to implement aspects of the present disclosure, including code to support latency reduction in unlicensed spectrum. Software 1730 may be stored in a non-transitory computer-readable medium such as system memory or other memory. In some cases, the software 1730 may not be directly executable by the processor 1720 but may cause a computer (e.g., when compiled and executed) to perform functions described herein.

Transceiver 1735 may communicate bi-directionally, via one or more antennas 1740, wired links, or wireless links as described in the present disclosure. For example, the transceiver 1735 may represent a wireless transceiver and may communicate bi-directionally with another wireless transceiver. The transceiver 1735 may also include a modem to modulate packets and provide the modulated packets to the antennas for transmission, and to demodulate packets received from the antennas.

In some cases, the wireless device may include a single antenna 1740. However, in some cases the device may have more than one antenna 1740, which may be capable of concurrently transmitting or receiving multiple wireless transmissions.

The network communications manager 1745 may manage communications with the core network (e.g., via one or more wired backhaul links). For example, the network communications manager 1745 may manage the transfer of data communications for client devices, such as one or more UEs 115.

The base station communications manager 1750 may manage communications with other base station 105, and may include a controller or scheduler for controlling communications with UEs 115 in cooperation with other base stations 105. For example, the base station communications manager 1750 may coordinate scheduling for transmissions to UEs 115 for various interference mitigation techniques such as beamforming or joint transmission. In some examples, base station communications manager 1750 may provide an X2 interface within an LTE/LTE-A wireless communication network technology to provide communication between base stations 105.

Figure 18:
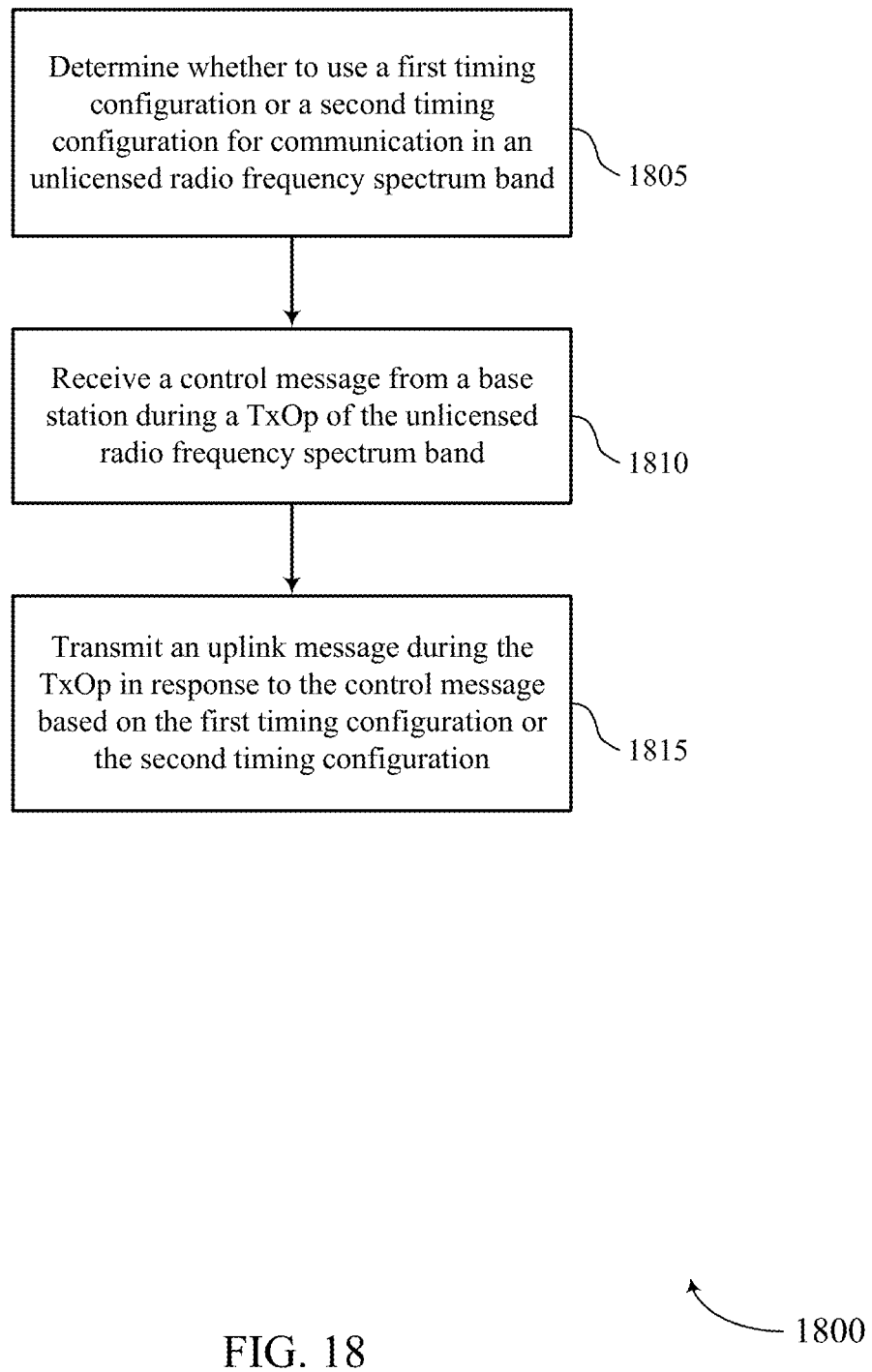
FIGS. 18 through 23 illustrate methods for latency reduction in unlicensed spectrum in accordance with aspects of the present disclosure.

FIG. 18 shows a flowchart illustrating a method 1800 for latency reduction in unlicensed spectrum in accordance with aspects of the present disclosure. The operations of method 1800 may be implemented by a UE 115 or its components as described herein. For example, the operations of method 1800 may be performed by a UE communication manager as described with reference to FIGS. 10 through 13. In some examples, a UE 115 may execute a set of codes to control the functional elements of the device to perform the operations of method 1800. Additionally or alternatively, the UE 115 may perform aspects of the functions of method 1800 using special-purpose hardware.

At 1805, the UE 115 may determine whether to use a first timing configuration or a second timing configuration for communication in an unlicensed radio frequency spectrum band, the first timing configuration having a first time difference between a DL communication and a responsive UL communication, and the second timing configuration having a second time difference between the DL communication and the responsive UL communication, the second time difference being less than the first time difference. In some examples, the determining may be based on a UE capability. The operations of 1805 may be performed according to the methods described with reference to FIGS. 1 through 9. In certain examples, aspects of the operations of 1805 may be performed by a timing configuration determination component as described with reference to FIGS. 10 through 13.

At 1810, the UE 115 may receive a control message from a base station 105 during a TxOp of the unlicensed radio frequency spectrum band. The operations of 1810 may be performed according to the methods described with reference to FIGS. 1 through 9. In certain examples, aspects of the operations of 1810 may be performed by a receiver, which may operate in cooperation with a UE communication manager, as described with reference to FIGS. 10 through 13.

At 1815, the UE 115 may transmit an UL message during the TxOp in response to the control message based at least in part on the first timing configuration or the second timing configuration. The UL message may include a CSI report based on the first timing configuration or the second timing configuration. The CSI report may be based on a reference measurement TTI, and the reference measurement TTI may be based on the first timing configuration or the second timing configuration. The reference measurement TTI may precede the UL message transmission by a threshold number of TTIs based on the first timing configuration or the second timing configuration. In some examples, the reference measurement TTI may be identified based on a subband of the unlicensed radio frequency spectrum band, where the UL message may be transmitted on a carrier within the unlicensed radio frequency spectrum band and the subband may include a bandwidth less than a bandwidth of the carrier. In some examples, the reference measurement TTI may be identified by a set of reference pilots arranged in a configuration having a first density greater than a second density of a CRS configuration. The operations of 1815 may be performed according to the methods described with reference to FIGS. 1 through 9. In certain examples, aspects of the operations of 1815 may be performed by a transmitter, which may operate in cooperation with a UE communication manager, as described with reference to FIGS. 10 through 13.

Figure 19:
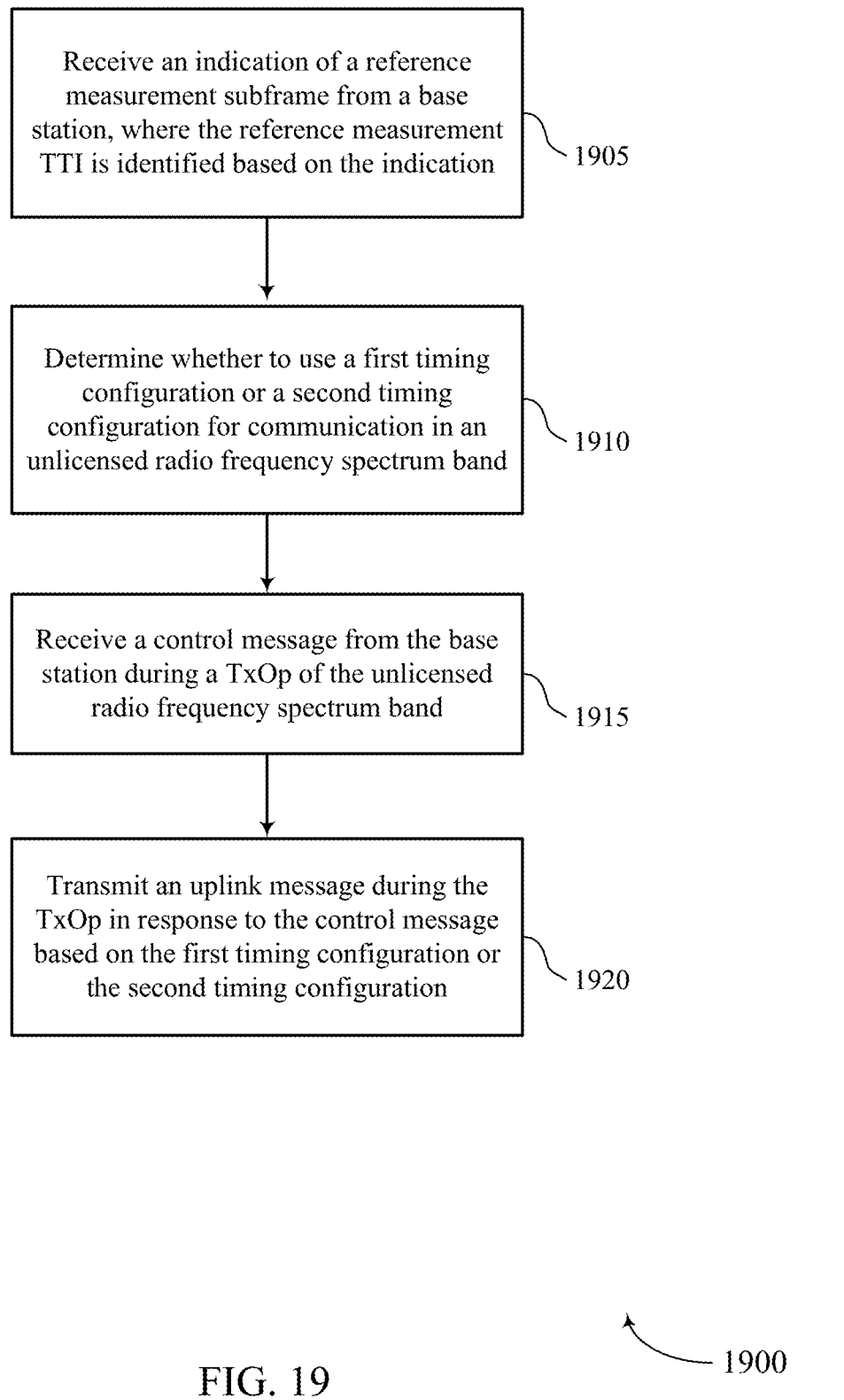

FIG. 19 shows a flowchart illustrating a method 1900 for latency reduction in unlicensed spectrum in accordance with aspects of the present disclosure. The operations of method 1900 may be implemented by a UE 115 or its components as described herein. For example, the operations of method 1900 may be performed by a UE communication manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At 1905, the UE 115 may receive an indication of a reference measurement TTI from a base station, wherein the reference measurement TTI is identified based at least in part on the indication. In some examples, the reference measurement TTI may be identified based on a subband of the unlicensed radio frequency spectrum band, where the UL message may be transmitted on a carrier within the unlicensed radio frequency spectrum band and the subband may include a bandwidth less than a bandwidth of the carrier. In some examples, the reference measurement TTI identified by a set of reference pilots arranged in a configuration having a first density that is greater than a second density of a CRS configuration. In some examples, the reference measurement TTI may be associated with an aperiodic CSI report, and the indication may be received in a grant or a CPDCCH. The operations of 1905 may be performed according to the methods described with reference to FIGS. 1 through 9. In certain examples, aspects of the operations of 1905 may be performed by a reference measurement TTI determination component, which may operate in cooperation with a receiver, as described with reference to FIGS. 10 through 13.

At 1910, the UE 115 may determine whether to use a first timing configuration or a second timing configuration for communication in an unlicensed radio frequency spectrum band, the first timing configuration having a first time difference between a DL communication and a responsive UL communication, and the second timing configuration having a second time difference between the DL communication and the responsive UL communication, the second time difference being less than the first time difference. The operations of 1910 may be performed according to the methods described with reference to FIGS. 1 through 9. In certain examples, aspects of the operations of 1910 may be performed by a timing configuration determination component as described with reference to FIGS. 10 through 13.

At 1915, the UE 115 may receive a control message from the base station during a TxOp of the unlicensed radio frequency spectrum band. The operations of 1915 may be performed according to the methods described with reference to FIGS. 1 through 9. In certain examples, aspects of the operations of 1915 may be performed by a receiver, which may operate in cooperation with a UE communication manager, as described with reference to FIGS. 10 through 13.

At 1920, the UE 115 may transmit an UL message during the TxOp in response to the control message based at least in part on the first timing configuration or the second timing configuration. The UL message may include a CSI report based on the first timing configuration or the second timing configuration. The CSI report may be based on a reference measurement TTI, and the reference measurement TTI may be based on the first timing configuration or the second timing configuration. The reference measurement TTI may precede the UL message transmission by a threshold number of TTIs that is based on the first timing configuration or the second timing configuration. The operations of 1920 may be performed according to the methods described with reference to FIGS. 1 through 9. In certain examples, aspects of the operations of 1920 may be performed by a transmitter, which may operate in cooperation with a UE communication manager, as described with reference to FIGS. 10 through 13.

Figure 20:
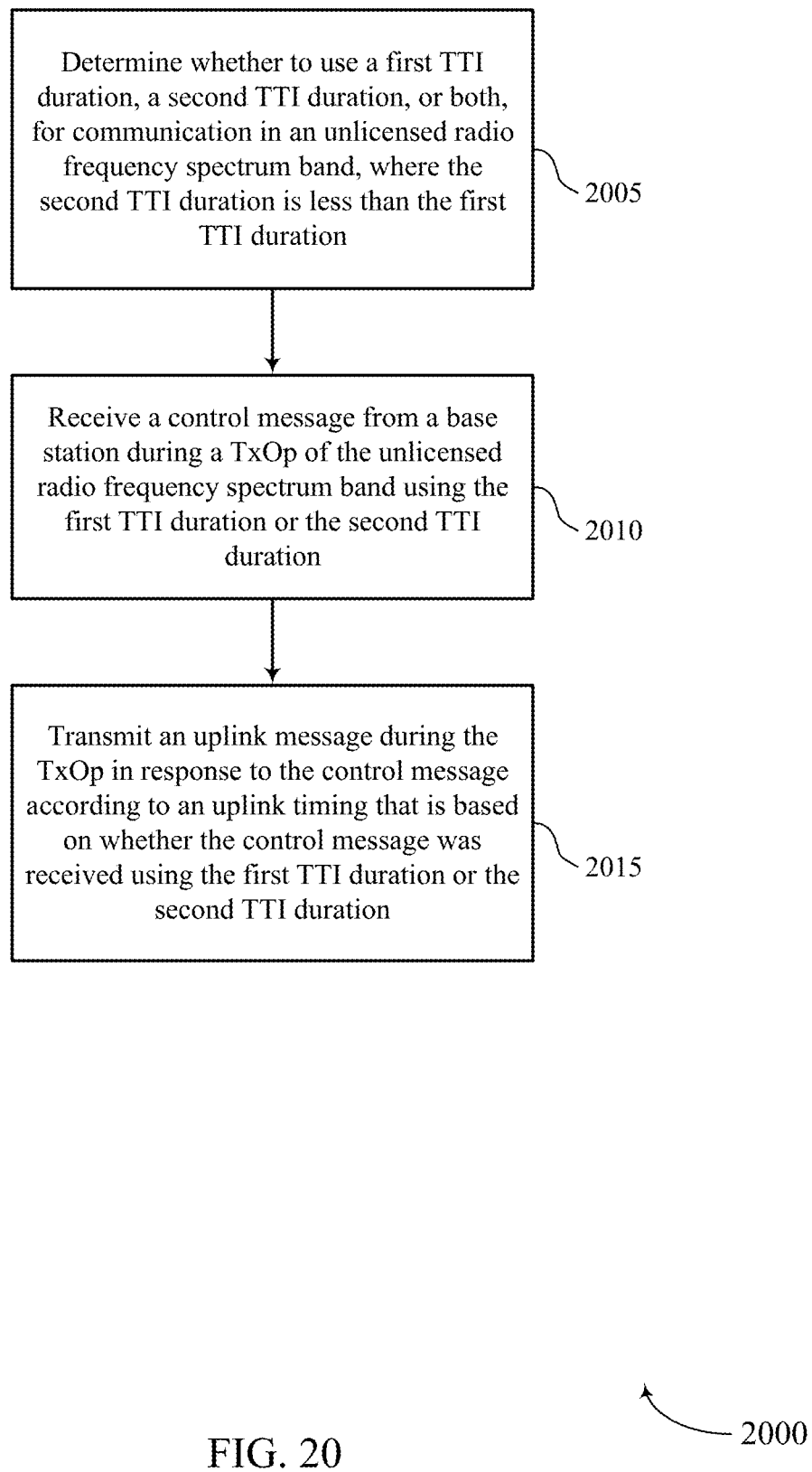

FIG. 20 shows a flowchart illustrating a method 2000 for latency reduction in unlicensed spectrum in accordance with aspects of the present disclosure. The operations of method 2000 may be implemented by a UE 115 or its components as described herein. For example, the operations of method 2000 may be performed by a UE communication manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At 2005, the UE 115 may determine whether to use a first TTI duration, a second TTI duration, or both, for communication in an unlicensed radio frequency spectrum band, where the second TTI duration is less than the first TTI duration. In some examples, a TTI of the first TTI duration may include one or more UL TTIs of the second TTI duration, one or more DL TTIs of the second TTI duration, or both. The operations of 2005 may be performed according to the methods described with reference to FIGS. 1 through 9. In certain examples, aspects of the operations of 2005 may be performed by a UE TTI configuration determination component as described with reference to FIGS. 10 through 13.

At 2010, the UE 115 may receive a control message from a base station during a TxOp of the unlicensed radio frequency spectrum band using the first TTI duration or the second TTI duration. In some examples, the control message may be a CPDCCH message and may indicate a reference measurement resource for generating a CSI report. The operations of 2010 may be performed according to the methods described with reference to FIGS. 1 through 9. In certain examples, aspects of the operations of 2010 may be performed by a control message reception component, which may operate in cooperation with a receiver, as described with reference to FIGS. 10 through 13.

At 2015, the UE 115 may transmit an UL message during the TxOp in response to the control message according to an UL timing based at on whether the control message was received using the first TTI duration or the second TTI duration. In some examples, the UL message may be transmitted after a response delay of four TTIs of the second TTI duration or six TTIs of the second duration. The operations of 2015 may be performed according to the methods described with reference to FIGS. 1 through 9. In certain examples, aspects of the operations of 2015 may be performed by an UL message transmission component, which may operate in cooperation with a transmitter, as described with reference to FIGS. 10 through 13.

Figure 21:
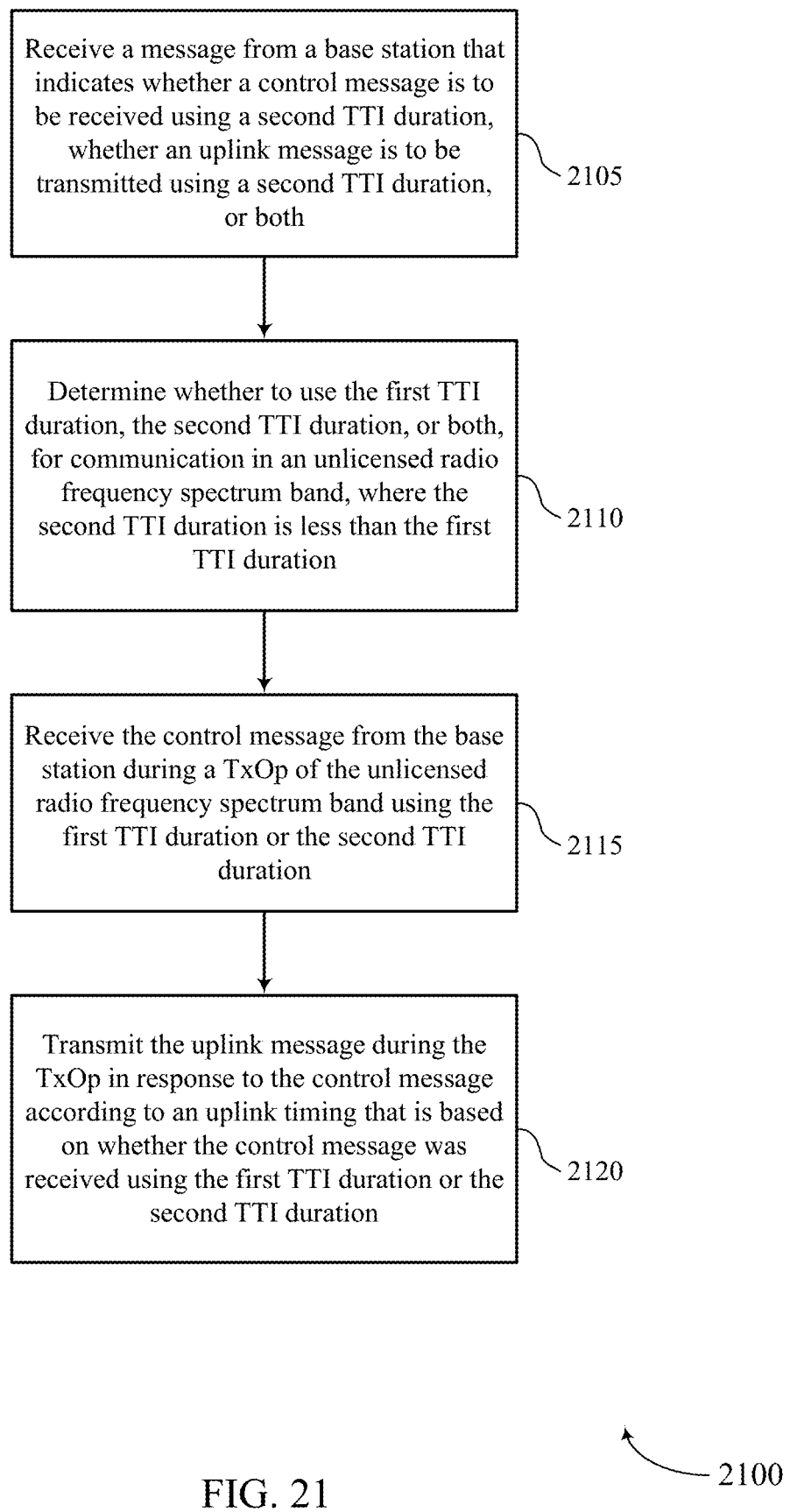

FIG. 21 shows a flowchart illustrating a method 2100 for latency reduction in unlicensed spectrum in accordance with aspects of the present disclosure. The operations of method 2100 may be implemented by a UE 115 or its components as described herein. For example, the operations of method 2100 may be performed by a UE communication manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At 2105, the UE 115 may receive a message from a base station that indicates whether a control message is to be received using a second TTI duration, whether a UL message is to be transmitted using a second TTI duration, or both. In some examples, the UE 115 may receive an indication of a DL TTI of the second TTI duration from the base station. In some cases, the UE 115 may receive an indication of a TTI configuration for one or more UL messages in a CPDCCH. The operations of 2105 may be performed according to the methods described with reference to FIGS. 1 through 9. In certain examples, aspects of the operations of 2105 may be performed by a UE TTI configuration determination component, which may operate in cooperation with a receiver, as described with reference to FIGS. 10 through 13.

At 2110, the UE 115 may determine whether to use the first TTI duration, the second TTI duration, or both, for communication in an unlicensed radio frequency spectrum band, wherein the second TTI duration is less than the first TTI duration. In some examples, a TTI of the first TTI duration may include one or more UL TTIs of the second TTI duration, one or more DL TTIs of the second TTI duration, or both. The operations of 2110 may be performed according to the methods described with reference to FIGS. 1 through 9. In certain examples, aspects of the operations of 2110 may be performed by a UE TTI configuration determination component as described with reference to FIGS. 10 through 13.

At 2115, the UE 115 may receive a control message from the base station during a TxOp of the unlicensed radio frequency spectrum band using the first TTI duration or the second TTI duration. In some examples, the control message may be a CPDCCH message and may indicate a reference measurement resource for generating a CSI report. The operations of 2115 may be performed according to the methods described with reference to FIGS. 1 through 9. In certain examples, aspects of the operations of 2115 may be performed by a control message reception component, which may operate in cooperation with a receiver, as described with reference to FIGS. 10 through 13.

At 2120, the UE 115 may transmit an UL message during the TxOp in response to the control message according to an UL timing that is based at least in part on whether the control message was received using the first TTI duration or the second TTI duration. In some examples, the UL message may be transmitted after a response delay of four TTIs of the second TTI duration or six TTIs of the second TTI duration. The operations of 2120 may be performed according to the methods described with reference to FIGS. 1 through 9. In certain examples, aspects of the operations of 2120 may be performed by an UL message transmission component, which may operate in cooperation with a transmitter, as described with reference to FIGS. 10 through 13.

Figure 22:
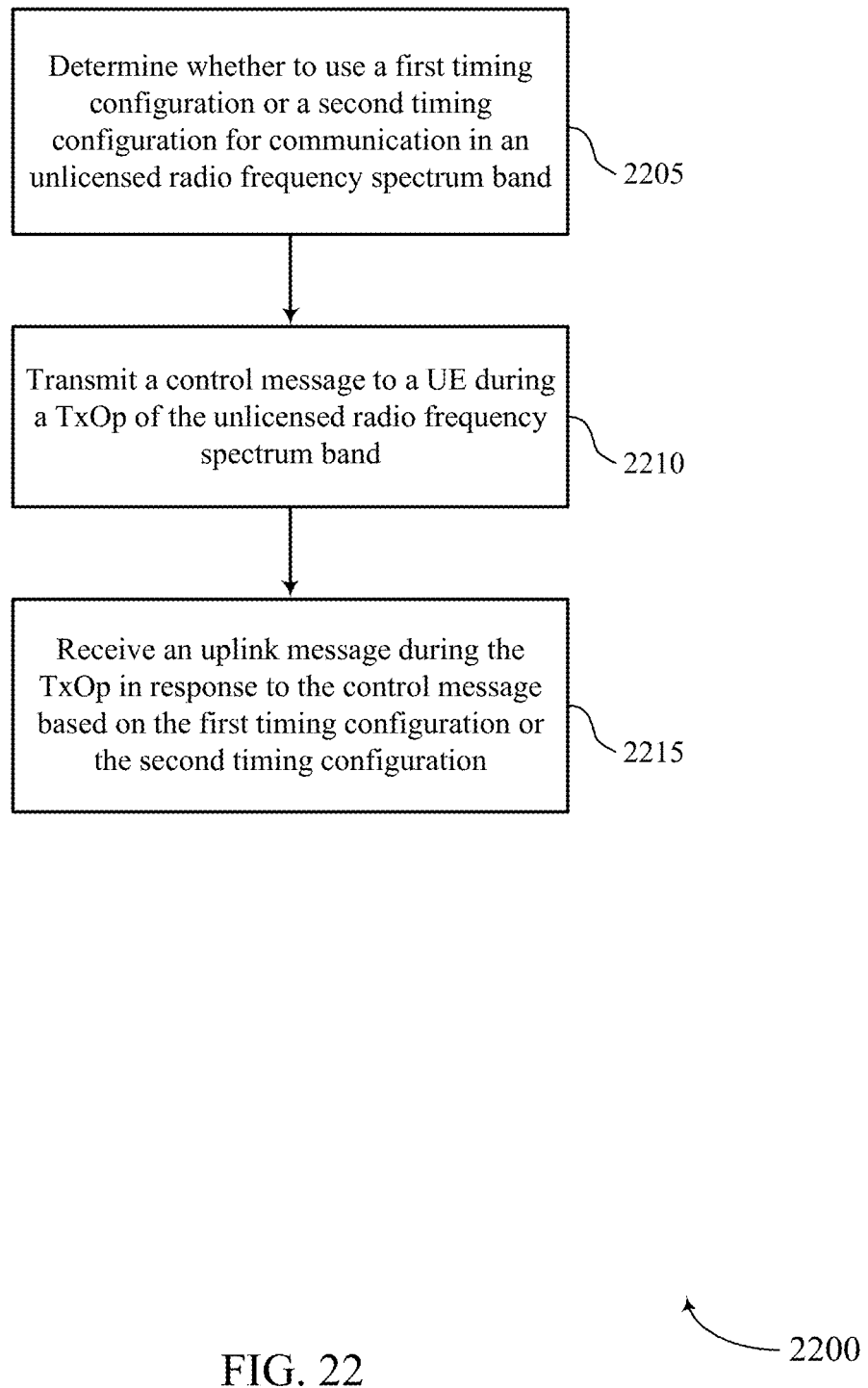

FIG. 22 shows a flowchart illustrating a method 2200 for latency reduction in unlicensed spectrum in accordance with aspects of the present disclosure. The operations of method 2200 may be implemented by a base station 105 or its components as described herein. For example, the operations of method 2200 may be performed by a base station wireless communications manager as described with reference to FIGS. 14 through 17. In some examples, a base station 105 may execute a set of codes to control the functional elements of the device to perform the functions described below. Additionally or alternatively, the base station 105 may perform aspects of the functions described below using special-purpose hardware.

At 2205, the base station 105 may determine whether to use a first timing configuration or a second timing configuration for communication in an unlicensed radio frequency spectrum band, the first timing configuration having a first time difference between a DL communication and a responsive UL communication, and the second timing configuration having a second time difference between the DL communication and the responsive UL communication, the second time difference being less than the first time difference. In some examples, determining whether to use the first timing configuration or the second timing configuration may be based on a capability of a UE 115. The operations of 2205 may be performed according to the methods described with reference to FIGS. 1 through 9. In certain examples, aspects of the operations of 2205 may be performed by a base station timing configuration determination component as described with reference to FIGS. 14 through 17.

At 2210, the base station 105 may transmit a control message to a UE 115 during a TxOp of the unlicensed radio frequency spectrum band. In some examples, the base station 105 may transmit an indication of a reference measurement TTI to the UE 115. The operations of 2210 may be performed according to the methods described with reference to FIGS. 1 through 9. In certain examples, aspects of the operations of 2210 may be performed by a transmitter, which may operate in cooperation with a base station wireless communications manager, as described with reference to FIGS. 14 through 17.

At 2215, the base station 105 may receive an UL message during the TxOp in response to the control message based at least in part on the first timing configuration or the second timing configuration. In some examples, the UL message may include a CSI report based on the first timing configuration or the second timing configuration. The operations of 2215 may be performed according to the methods described with reference to FIGS. 1 through 9. In certain examples, aspects of the operations of 2215 may be performed by a receiver, which may operate in cooperation with a base station wireless communications manager, as described with reference to FIGS. 14 through 17.

Figure 23:
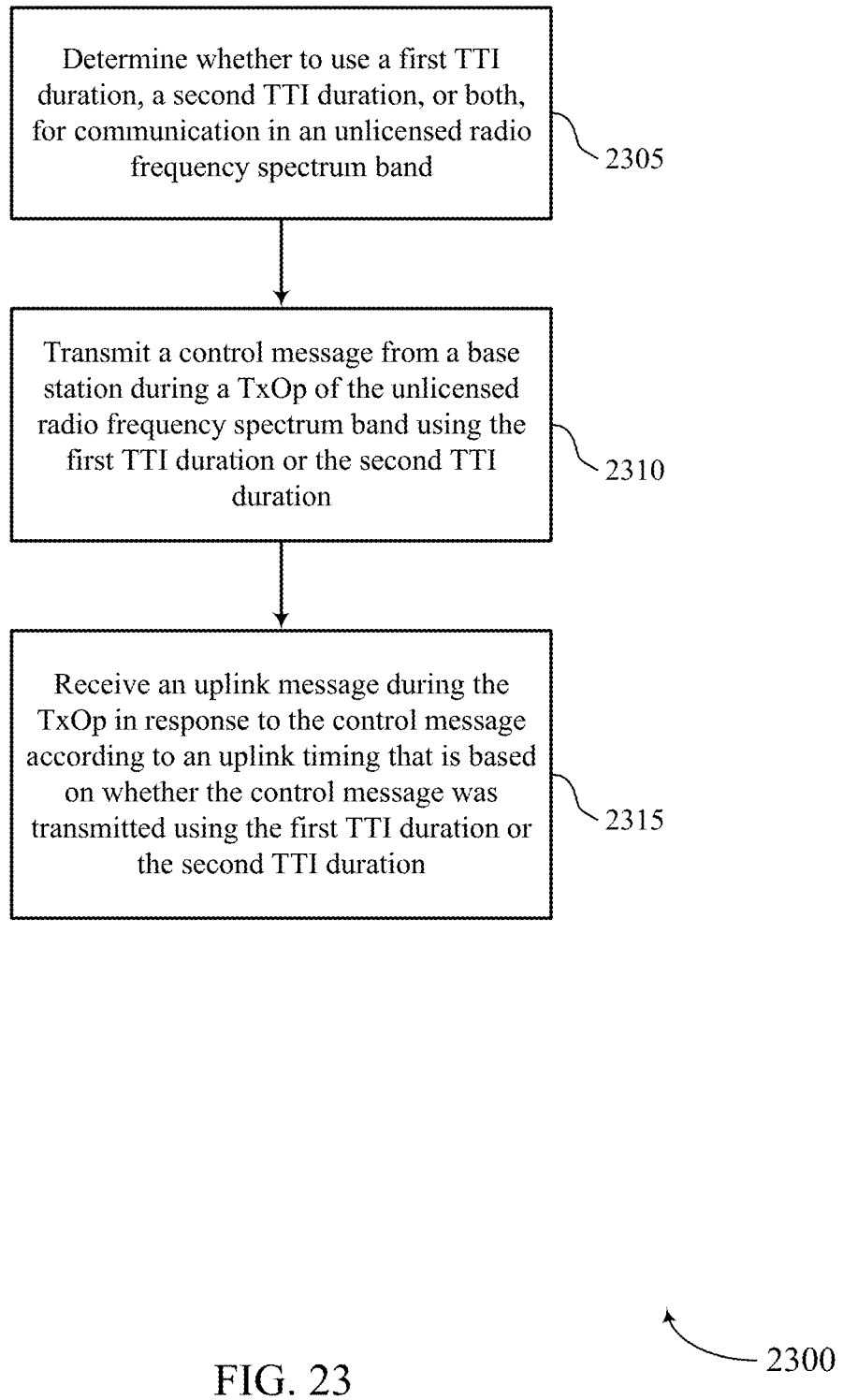

FIG. 23 shows a flowchart illustrating a method 2300 for latency reduction in unlicensed spectrum in accordance with aspects of the present disclosure. The operations of method 2300 may be implemented by a base station 105 or its components as described herein. For example, the operations of method 2300 may be performed by a base station wireless communications manager as described with reference to FIGS. 14 through 17. In some examples, a base station 105 may execute a set of codes to control the functional elements of the device to perform the functions described below. Additionally or alternatively, the base station 105 may perform aspects of the functions described below using special-purpose hardware.

At 2305, the base station 105 may determine whether to use a first TTI duration, a second TTI duration, or both, for communication in an unlicensed radio frequency spectrum band. In some examples, the control message may be transmitted using the second TTI duration and the UL message may be received using the first TTI duration. In other examples, the control message may be transmitted using the second TTI duration and the UL message may be received using the second TTI duration. The operations of 2305 may be performed according to the methods described with reference to FIGS. 1 through 9. In certain examples, aspects of the operations of 2305 may be performed by a base station TTI configuration determination component as described with reference to FIGS. 14 through 17.

At 2310, the base station 105 may transmit a control message from a base station during a TxOp of the unlicensed radio frequency spectrum band using the first TTI duration or the second TTI duration. The operations of 2310 may be performed according to the methods described with reference to FIGS. 1 through 9. In certain examples, aspects of the operations of 2310 may be performed by a control message transmission component, which may operate in cooperation with a transmitter, as described with reference to FIGS. 14 through 17.

At 2315, the base station 105 may receive an UL message during the TxOp in response to the control message according to an UL timing that is based at least in part on whether the control message was transmitted using the first TTI duration or the second TTI duration. The operations of 2315 may be performed according to the methods described with reference to FIGS. 1 through 9. In certain examples, aspects of the operations of 2315 may be performed by an UL message reception component, which may operate in cooperation with a receiver, as described with reference to FIGS. 14 through 17.

It should be noted that the methods described in the present disclosure describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-Advanced (LTE-A) are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned in the present disclosure as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, gNB, or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the present disclosure may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described in the present disclosure can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," "component," and the like may not be a substitute for the word "means." As such, no claim element is to be construed as a means plus function unless the element is expressly recited using the phrase "means for."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    establishing a connection with a base station, the connection supporting a first time difference between downlink communication and responsive uplink communication and supporting a second time difference between the downlink communication and the responsive uplink communication;
    receiving an indication from the base station of whether to use the first time difference or to use the second time difference, wherein the indication of whether to use the first time difference or to use the second time difference comprises an indication of an offset, from a start of a subframe, for uplink transmissions; and
    transmitting an uplink transmission in response to a control message from the base station with an uplink timing that is based at least in part on receiving the indication of whether to use the first time difference or the second time difference.

2. The method of claim 1, wherein receiving the indication of whether to use the first time difference or to use the second time difference comprises:
    receiving the indication in a second control message from the base station.

3. The method of claim 1, further comprising:
    receiving, in a transmission time interval, a grant of resources to transmit the uplink transmission; and
    transmitting the uplink transmission with the uplink timing that is based at least in part on a time of the transmission time interval and on the indication of the offset.

4. The method of claim 1, wherein the indication of whether to use the first time difference or to use the second time difference is based at least in part on a duration of a transmission time interval associated with the control message.

5. A method for wireless communication at a user equipment (UE), comprising:
    establishing a connection with a base station, the connection supporting a first time difference between downlink communication and responsive uplink communication and supporting a second time difference between the downlink communication and the responsive uplink communication;
    receiving an indication from the base station of whether to use the first time difference or to use the second time difference, wherein the indication of whether to use the first time difference or to use the second time difference comprises an indication of a quantity of transmission time intervals between an uplink grant and a responsive uplink transmission; and
    transmitting an uplink transmission in response to a control message from the base station with an uplink timing that is based at least in part on receiving the indication of whether to use the first time difference or the second time difference.

6. The method of claim 1, wherein the indication of whether to use the first time difference or to use the second time difference comprises an indication of an UL and DL pattern from the base station.

7. The method of claim 1, wherein receiving the indication of whether to use the first time difference or to use the second time difference comprises:
    receiving the indication in a shortened physical downlink control channel (sPDCCH).

8. An apparatus for wireless communication at a user equipment (UE), comprising:
    a processor;
    memory in electronic communication with the processor; and
    instructions stored in the memory and executable by the processor to cause the apparatus to:
        establish a connection with a base station, the connection supporting a first time difference between downlink communication and responsive uplink communication and supporting a second time difference between the downlink communication and the responsive uplink communication;
        receive an indication from the base station of whether to use the first time difference or to use the second time difference, wherein the indication of whether to use the first time difference or to use the second time difference comprises an indication of an offset, from a start of a subframe, for uplink transmissions; and
        transmit an uplink transmission in response to a control message from the base station with an uplink timing that is based at least in part on receiving the indication of whether to use the first time difference or the second time difference.

9. The apparatus of claim 8, wherein the instructions to receive the indication of whether to use the first time difference or to use the second time difference are executable by the processor to cause the apparatus to:
    receive the indication in a second control message from the base station.

10. The apparatus of claim 8, wherein the instructions are executable by the processor to cause the apparatus to:
    receive, in a transmission time interval, a grant of resources to transmit the uplink transmission; and
    transmit the uplink transmission with the uplink timing that is based at least in part on a time of the transmission time interval and on the indication of the offset.

11. The apparatus of claim 8, wherein the indication of whether to use the first time difference or to use the second time difference is based at least in part on a duration of a transmission time interval associated with the control message.

12. An apparatus for wireless communication at a user equipment (UE), comprising:
a processor;
memory in electronic communication with the processor; and
instructions stored in the memory and executable by the processor to cause the apparatus to:
establish a connection with a base station, the connection supporting a first time difference between downlink communication and responsive uplink communication and supporting a second time difference between the downlink communication and the responsive uplink communication;
receive an indication from the base station of whether to use the first time difference or to use the second time difference, wherein the indication of whether to use the first time difference or to use the second time difference comprises an indication of a quantity of transmission time intervals between an uplink grant and a responsive uplink transmission; and
transmit an uplink transmission in response to a control message from the base station with an uplink timing that is based at least in part on receiving the indication of whether to use the first time difference or the second time difference.

13. The apparatus of claim 8, wherein the indication of whether to use the first time difference or to use the second time difference comprises an indication of an UL and DL pattern from the base station.

14. The apparatus of claim 8, wherein the instructions to receive the indication of whether to use the first time difference or to use the second time difference are executable by the processor to cause the apparatus to:
receive the indication in a shortened physical downlink control channel (sPDCCH).

15. An apparatus for wireless communication at a user equipment (UE), comprising:
means for establishing a connection with a base station, the connection supporting a first time difference between downlink communication and responsive uplink communication and supporting a second time difference between the downlink communication and the responsive uplink communication;
means for receiving an indication from the base station of whether to use the first time difference or to use the second time difference, wherein the indication of whether to use the first time difference or to use the second time difference comprises an indication of an offset, from a start of a subframe, for uplink transmissions; and
means for transmitting an uplink transmission in response to a control message from the base station with an uplink timing that is based at least in part on receiving the indication of whether to use the first time difference or the second time difference.

16. A non-transitory computer-readable medium storing code for wireless communication at a user equipment (UE), the code comprising instructions executable by a processor to:
establish a connection with a base station, the connection supporting a first time difference between downlink communication and responsive uplink communication and supporting a second time difference between the downlink communication and the responsive uplink communication;
receive an indication from the base station of whether to use the first time difference or to use the second time difference, wherein the indication of whether to use the first time difference or to use the second time difference comprises an indication of an offset, from a start of a subframe, for uplink transmissions; and
transmit an uplink transmission in response to a control message from the base station with an uplink timing that is based at least in part on receiving the indication of whether to use the first time difference or the second time difference.

* * * * *